United States Patent [19]

Oprescu

[11] Patent Number: 5,784,557
[45] Date of Patent: Jul. 21, 1998

[54] METHOD AND APPARATUS FOR TRANSFORMING AN ARBITRARY TOPOLOGY COLLECTION OF NODES INTO AN ACYCLIC DIRECTED GRAPH

[75] Inventor: Florin Oprescu, Sunnyvale, Calif.

[73] Assignee: Apple Computer, Inc., Cupertino, Calif.

[21] Appl. No.: 777,909

[22] Filed: Dec. 20, 1996

Related U.S. Application Data

[63] Continuation of Ser. No. 517,074, Aug. 21, 1995, abandoned, which is a continuation of Ser. No. 994,128, Dec. 21, 1992, abandoned.

[51] Int. Cl.[6] .................................................. G06F 13/00
[52] U.S. Cl. ........................... 395/200.5; 395/200.82; 370/254; 370/255; 370/256
[58] Field of Search .......................... 395/800, 200.01, 395/200.1, 800.01, 200.3, 200.5, 200.82; 370/254, 255, 256

[56] References Cited

U.S. PATENT DOCUMENTS

| | | | |
|---|---|---|---|
| 4,344,134 | 8/1982 | Barnes | 364/DIG. 1 |
| 4,698,752 | 10/1987 | Goldstein et al. | 364/DIG. 1 |
| 4,706,080 | 11/1987 | Sincoskie | 340/825.52 |
| 4,740,954 | 4/1988 | Cotton et al. | 370/60 |
| 4,811,337 | 3/1989 | Hart | 370/85 |
| 4,881,166 | 11/1989 | Thompson et al. | 364/DIG. 1 |
| 5,018,133 | 5/1991 | Tsukakoshi et al. | 370/16 |
| 5,079,767 | 1/1992 | Perlman | 370/94.3 |
| 5,088,032 | 2/1992 | Bosack | 395/200.01 |
| 5,138,615 | 8/1992 | Lamport et al. | 370/94.3 |
| 5,150,360 | 9/1992 | Perlman et al. | 370/94.3 |
| 5,280,619 | 1/1994 | Wang | 395/725 |
| 5,309,437 | 5/1994 | Perlman et al. | 370/85.13 |
| 5,355,371 | 10/1994 | Auerbach et al. | 370/60 |
| 5,491,692 | 2/1996 | Gunner et al. | 370/85.13 |

FOREIGN PATENT DOCUMENTS

| | | |
|---|---|---|
| 0118731 | 9/1984 | WIPO . |
| 9206436 | 4/1992 | WIPO . |

OTHER PUBLICATIONS

Even et al., "How to keep a dynamic distributive directed graph acyclic and yet grant all request of edge additions," JCIT, Oct. 22-25 1990, pp. 414-425.

Jovanovic, "Software Pipelining of Loops by Pipelining Strongly Connected Components," IEEE 1991, pp. 351-365.

(List continued on next page.)

*Primary Examiner*—Alyssa H. Bowler
*Assistant Examiner*—Walter D. Davis, Jr.
*Attorney, Agent, or Firm*—Blakely, Sokoloff, Taylor & Zafman

[57] ABSTRACT

A system and method are described which take an arbitrarily assembled collection of nodes on a bus or network and imposes an optimized hierarchical tree structure where there is only one root node. Nodes having both parent and child nodes are considered branch nodes while nodes having only parent nodes are leaf nodes. Loops or cycles in the physical topology are resolved into a logical topology that is acyclic and directed. A signaling scheme is developed in which nodes, via on board communications hardware, signal all connected nodes and respond accordingly until hierarchical relationships are established. Cycles are resolved by intelligently breaking links to yield an acyclic graph. Direction is established by each node recognizing its parent/child status with respect to connected nodes until a single node is established as a root node.

27 Claims, 15 Drawing Sheets

OTHER PUBLICATIONS

Belik, "An Efficient Deadlock Avoidance Technique," IEEE Transactions on Computers, Jul. 1990, pp. 882–888.

Chaudhary, "A Near Optimal Algorithm for Technology Mapping Minimizing Area under Delay Constraints," ACM/IEEE Design Automation Conference, Jun. 1992, pp. 492–498.

Ravindran et al., "Multicast Models and Routing Algorithms for High Speed Multi-service Networks," IEEE 1992, pp. 194–201.

Neilsen et al., "A Dag-Based Algorithm for Distributed Mutual Exclusion," IEEE, May 1991, pp. 354–360.

Toshinori Sueyoshi, "Hierarchical Routing Bus", 1985, vol. 16, pp. 10–19.

Cidon et al, "Dynamic Tree Detection in Computer Network", IEEE, Apr. 1987, pp. 181–187.

Bowie, "*Distributed Operating Systems*," Abstract, Computer Science Conference, Feb. 20, 1975, p. 24, Washington D.C.

Cidon and Gopal, "*Dynamic Tree Detection in Computer Networks*," Proceedings of IEEE, Infocom, Apr. 2, 1987, pp. 181–187, San Francisco, USA.

Wu, et al., "*Prototype of Star Architecture–A Status Report*," AFIPS Conference Proceedings, Jul. 18, 1985, Chicago, U.S., pp. 191–201.

Bokhari and Raza, "*Augmenting Computer Networks*," Proceedings of the 1984 International Conference on Parallel Processing, Aug. 24, 1984, Ohio, U.S., pp. 338–345.

"*IEEE Standards for Low-Voltage Differential Signals (LVDS) for Scalable Coherent Interface (SCI)*, The Institute of Electrical and Electronics Engineers, Inc., Jul. 31, 1996.

"*IEEE Standards for Local and Metropolitan Area Networks: Media Access Control (MAC) Bridges*", The Institute of Electrical and Electronics Engineers, Inc., Mar. 8, 1991.

"Local Area Network Applications", Bob Stewart and Bill Hawe, *Telecommunications*., Sep. 1984, vol. 18, No. 9, pp. 4, pp. 96F–96M.

METHOD AND APPARATUS FOR TRANSFORMING AN ARBITRARY TOPOLOGY COLLECTION OF NODES INTO AN ACYCLIC DIRECTED GRAPH

This is a continuation of application Ser. No. 08/517,074, filed Aug. 21,1995, now abandoned, which is a continuation of application Ser. No. 07/994,128, filed Dec. 21, 1992, abandoned.

BACKGROUND OF THE INVENTION

Related Applications

This application is related to applications Ser. No. 07/994, 402, entitled "Method and Apparatus for Unique Address Assignment, Node Self-Identification and Topology Mapping for a Directed Acyclic Graph", Ser. No. 07/994,983, entitled "Method and Apparatus for Arbitrating on an Acyclic Directed Graph" and Ser. No. 07/994,117, entitled "Method and Apparatus for Transforming an Arbitrary Acyclic Topology Collection of Nodes into an Acyclic Directed Graph" each of which is assigned to the assignee of the present application and filed concurrently herewith.

FIELD OF THE INVENTION

The present invention relates to computer systems. More particularly, the present invention relates to a method and apparatus for establishing and utilizing a communications scheme between a plurality of arbitrarily assembled elements of a computer system.

BACKGROUND

Components within a given computer system need the ability to convey signals amongst themselves. In very simple systems, it is possible to have each element of the system directly wired to all of the other parts of the system. However, in reality, in order to make computers expandable and to accommodate an unknown number of system parts, computer architects long ago developed the concept of a communications bus.

A bus is a communications path, such as a wire or wires, running throughout the computer system. Each component of the system need only plug into the bus to be theoretically connected to each of the other components in the system. Of course, each component cannot simultaneously communicate with other components because there may be only a single communications channel between the components. It is necessary when utilizing a communications bus to establish some form a sharing arrangement so that each component may use the bus to communicate with other components in an efficient manner that does not leave critical pieces of information from one component hanging, waiting for bus access. The method by which components on the bus share the bus is generally referred to as a bus arbitration scheme.

In addition to the critical need to optimize the bus arbitration scheme so as to maximize the flow of important information, the physical (and logical/electrical) configuration of the bus itself can and should be optimized to minimize system delays while remaining as flexible as possible.

In order to communicate with other components attached to a bus, each component must be equipped with hardware such as transmitting and receiving circuitry compatible with the communications protocol implemented for the bus. One such communications standard is described in IEEE Standards Document P1394 entitled "High Performance Serial Bus", said document attached as Appendix A. The standard described in P1394 is intended to provide a low cost interconnect between cards on the same backplane, cards on other backplanes, and external peripherals.

Prior art buses or networks required knowing what was being plugged in where. For example, the back of many computers have specified ports for specific peripherals. Some computers implement several buses, such as the Macintosh which uses a bus referred to as ADB for components like a mouse and keyboard and SCSI bus for other peripherals. These types of buses provide for daisy chaining elements together but connections are of limited topology. Other known buses/networks require that the nodes of the network be arranged in a ring, a loop which must be closed in order to operate. Finally, star, or hub-and-spoke arrangements required that each node be directly linked to a central master. Each of the prior art systems lacks a desirable measure of flexibility.

It would be desirable, and is therefore and object of the present invention, to be able to arbitrarily assemble elements of a computer system onto a bus where the arbitrary topology can be resolved by the system into a functioning system without requiring a predetermined arrangement of components.

SUMMARY OF THE INVENTION

It is an object of the present invention to provide enhanced computer system performance by optimizing the way the various system components communicate regardless of the physical topology.

It is also an object of the present invention to provide a method for transforming an arbitrary topology graph having simple or multiple cycles into an acyclic graph.

It is another object of the present invention to provide a method for transforming an acyclic graph into a directed acyclic graph.

It is still another object of the present invention to provide a method for transforming any arbitrary topology graph into an acyclic directed graph, said acyclic directed graph being useful for implementing computer system bus and network communications schemes.

These and other objects of the present invention are provided by a system and method which take an arbitrarily assembled collection of nodes on a bus or network and imposes an optimized hierarchical tree structure where there is only one root node. Nodes having both parent and child nodes are considered branch nodes while nodes having only parent nodes are leaf nodes. Loops or cycles in the physical topology are resolved into a logical topology that is acyclic and directed. A signaling scheme is developed in which nodes, via on board communications hardware, signal all connected nodes and respond accordingly until hierarchical relationships are established. Cycles are resolved by intelligently breaking links to yield an acyclic graph. Direction is established by each node recognizing its parent/child status with respect to connected nodes until a single node is established as a root node.

BRIEF DESCRIPTION OF THE DRAWINGS

The objects, features and advantages of the present invention will be apparent from the following detailed description in which.

DETAILED DESCRIPTION OF THE INVENTION

A method and apparatus for utilizing a bus having an arbitrary topology are described. In the following description, many specific details are set forth such as various computer components in order to provide a thorough understanding of the present invention. It will be obvious, however, to one skilled in the art that the present invention may be practiced without such specific details. In other instances, well-known control structures and coding techniques have not been described in detail in order not to obscure unnecessarily the present invention.

Throughout this detailed description, numerous descriptive terms are introduced to provide metaphorical clarity to the description. For example, frequent references will be made to parent-child relationships between nodes in a given topology. The purpose of this is to provide the concept of "direction" to the finally resolved graph. As will be described, once an arbitrary topology has been reduced to an acyclic directed graph, there will be one node identified as the "root" node. The root node will not have a parent node, all nodes logically immediately adjacent to the root node are the child nodes of the root. The "tree" metaphor is completed by the inclusion of nodes referred to as "branches" and "leaves".

The bus architecture described herein, though described with reference to components for a single computer, in general has a broader scope. The present invention for defining the bus topology may be applied to any arbitrarily assembled collection of nodes linked together as in a network of devices. One point that must be noted is that it is necessary to distinguish a node from a physical computer component. Each component to reside on the bus will have associated with it at least one node physical layer controller. In certain circumstance, a given component may advantageously be associated with multiple nodes but in the usual case there will be a one-to-one correspondence between devices or components on the bus and nodes.

Figure 1:
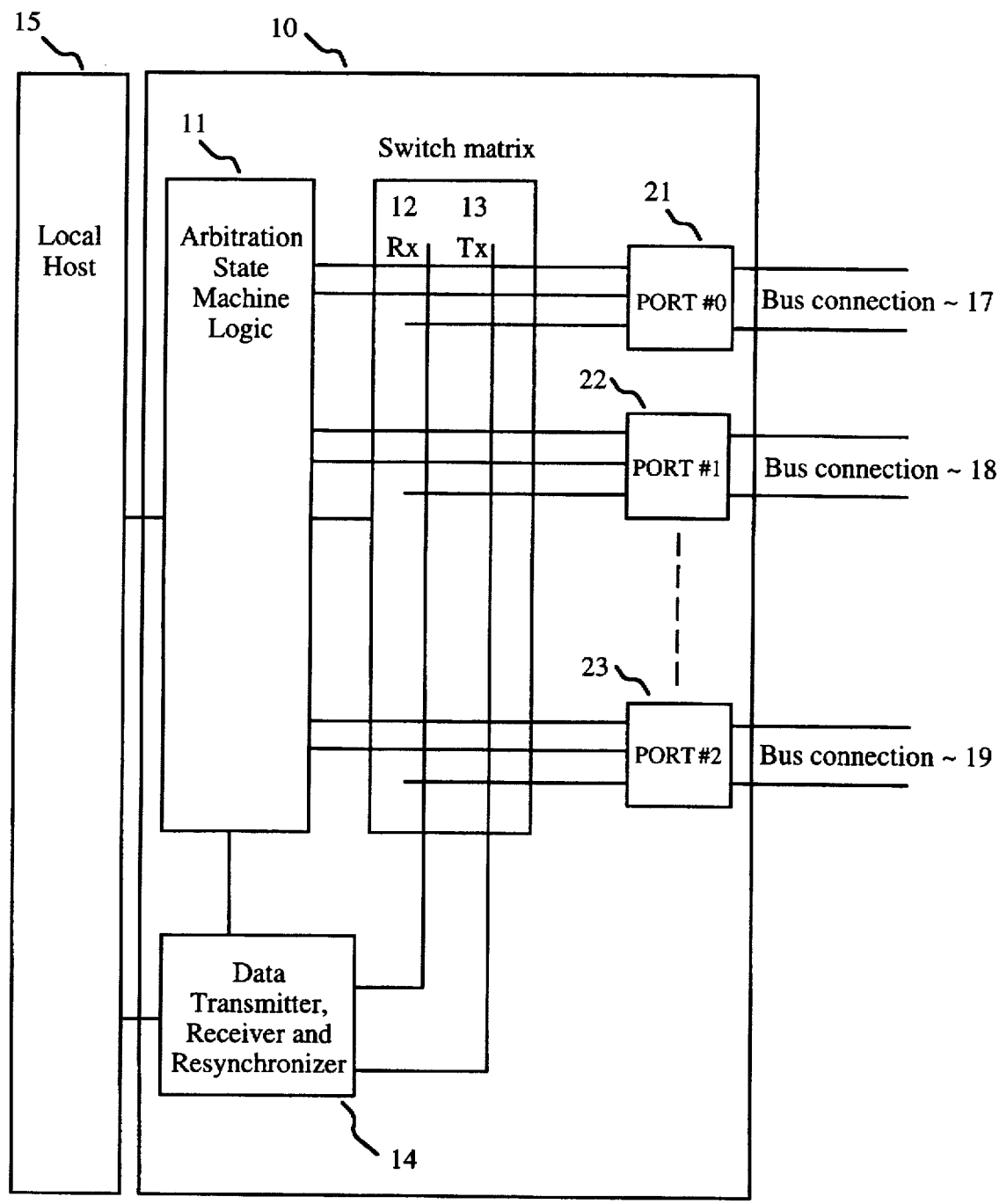
FIG. 1 illustrates a block diagram of the hardware layer implementation utilized in accordance with the present invention.

Referring now to FIG. 1 a block diagram of a node 10 is illustrated. The physical implementation of a node is somewhat arbitrary. In the preferred embodiment implementation of the present invention, the nodes are designed to comply with the IEEE P1394 *High Performance Serial Bus* communications protocol which is attached as Appendix A. The node 10 includes arbitration state machine logic 11. This arbitration state machine logic incorporates all the logic circuitry for carrying out the methodologies and algorithms to be described herein. The circuitry may comprise a programmable logic array (PLA) or be uniquely designed to carry out the functions described herein. Those skilled in the art, once described the functions to be carried out by the node logic will be able to implement the present invention without undue experimentation. The node, by means of its logic, shall implement the minimum arbitration protocol including the bus initialization, tree identification, self identification, and the bus arbitration functions, all to be described in detail further herein.

The node 10 shown in FIG. 1 also includes transmission multiplexers 12 and 13 and data transmitter, receiver and resynchronizer 14. The node illustrated in FIG. 1 is coupled to local host 15. Local host 15 may be any device one wishes to attach to the bus such as a disk drive, CPU, keyboard or any other component which needs to communicate with other components in the system. The node 10 communicates with other nodes through communications links. A link is a connection between two ports and in immediate practical terms is a cable segment but in general it may be implemented as any physical communication channel. A link shall be able, at minimum, to provide a half duplex communication channel between the two ports which it connects. A port is the interface between a node and a link. In accordance with the present invention, a port must have the ability to transmit and receive data and arbitration signaling. A port needs to be able to determine whether or not it is connected to another port through a link. One method of facilitating this is by having connected ports apply a biasing voltage through the link which is detectable by the port at the other end of the link. Thus, if a port has a link attached which is not connected to a port at the other end, a naked link, the port will determine that it is not a connected port. In FIG. 1, the illustrated node 10 has three external ports 21, 22 and 23 with connecting links 17, 18 and 19, respectively.

Some of the rules of implementation for nodes in order to implement the present invention are that a node may have one or more ports. A node shall be able to transmit and receive data on any one of its ports. A node shall be able to receive data on one and only one of its enabled ports at a time and be able to retransmit this data on all remaining enabled ports. A node shall be able to receive and transmit signaling messages through all of its ports simultaneously and independently. Separate signaling transceivers, encoders and decoders are required for each port of a node. A minimum implementation node does not require a local host device. For example, such a node may function as a cable extension. From hereon devices and local hosts will be ignored and all references to bus topology will refer to nodes and node connections through various ports.

Graph Transformation

Figure 2A:
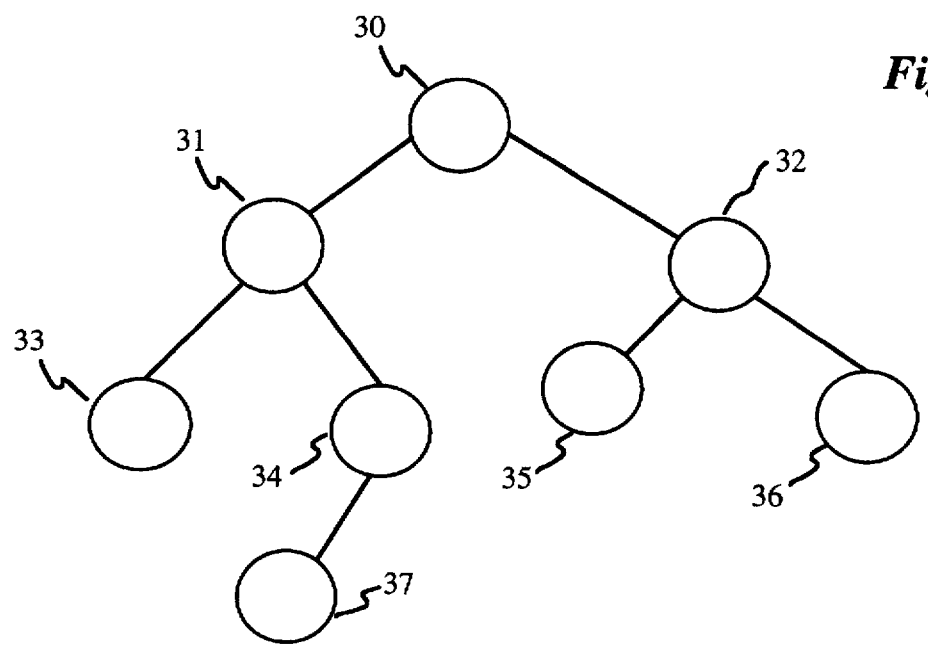
FIGS. 2(a)-2(b) illustrate arbitrarily assembled collection of nodes, one being acyclic and the other including multiple cycles.
Figure 2B:
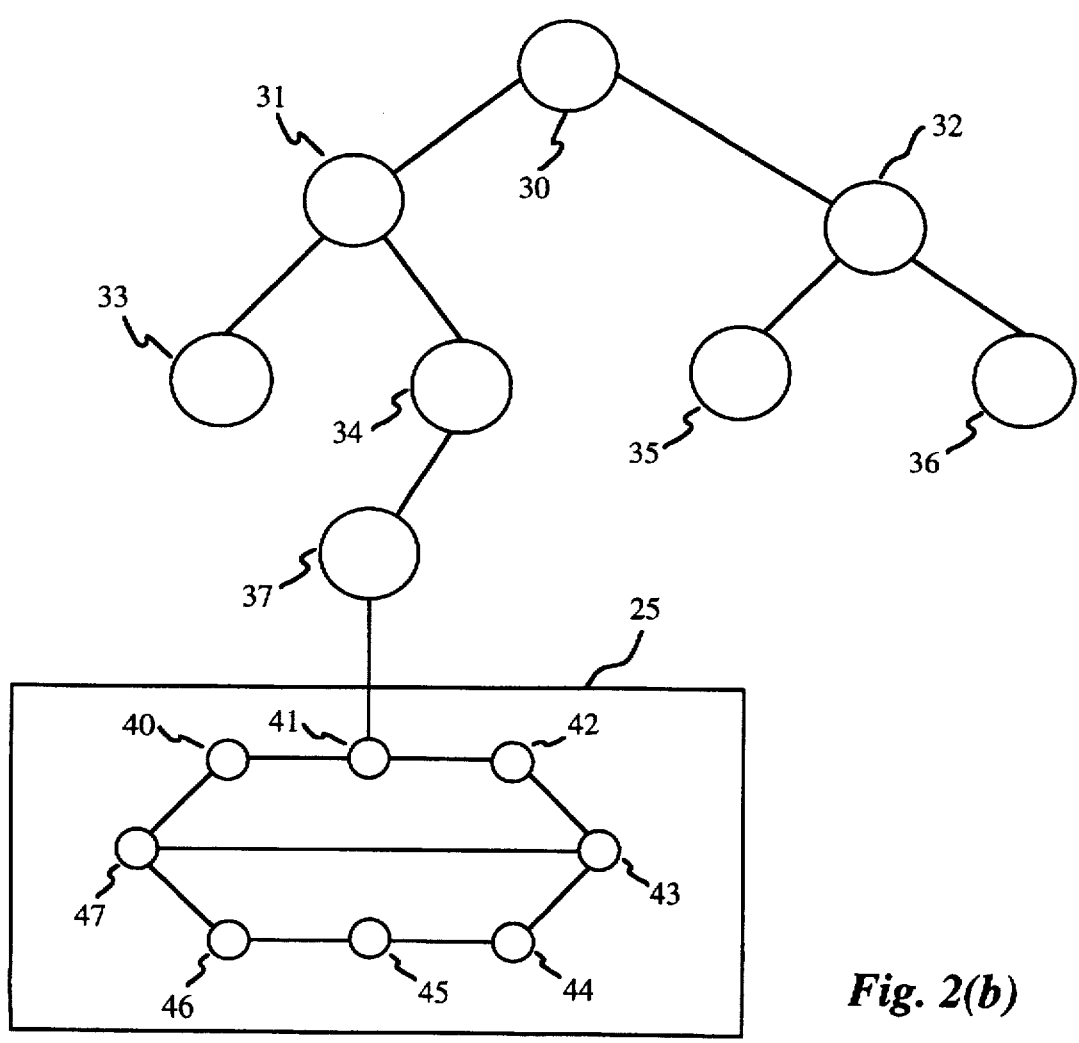

FIGS. 2(a) and 2(b) illustrate arbitrarily assembled collections of nodes. From hereon, nodes will be illustrated merely as circles, but are deemed to each incorporate elements equivalent to those described with respect to FIG. 1. Note, however, that each node may have more or less than the three external ports shown in that figure. The lines illustrated connecting each of the nodes are the method by which links are shown. Ports are not illustrated, but are impliedly the interface where a link and a node connect.

The bus arbitration methodology to be described herein requires that the arbitrary topology be resolved into an acyclic directed graph. In an arbitrary topology graph a collection of nodes and links may form a cycle. A cycle exists if starting from a specific node in the graph it is possible to return to the same node by traversing links and nodes without any link being traversed twice. FIG. 2(a) illustrates an acyclic graph because none of the nodes illustrated are connected within a loop. FIG. 2(b), however, is not an acyclic graph because the region in bounding box 25 contains a collection of nodes, 40–47 which form multiple cycles. The bus arbitration methodology to be described requires that there be no cycles, so a method of cycle resolution will also be described further herein.

In addition to the requirement that a graph be acyclic, it must also be directed. A directed graph is one in which a hierarchical arrangement has been established between adjacent nodes. Initially, there are no established parent-child relationships between nodes. That is, for example, node 31 may be the "parent node" for node 34, or be the "child node" for node 34. Thus, it is necessary to take a given arbitrary topology graph and transform it into an acyclic and directed graph. The methods described herein will work to perform this transformation for any given arbitrary topology, regardless of the number of nodes or how they are physically linked and regardless of the signaling propagation time along the links.

Node Communication

Figure 3A:
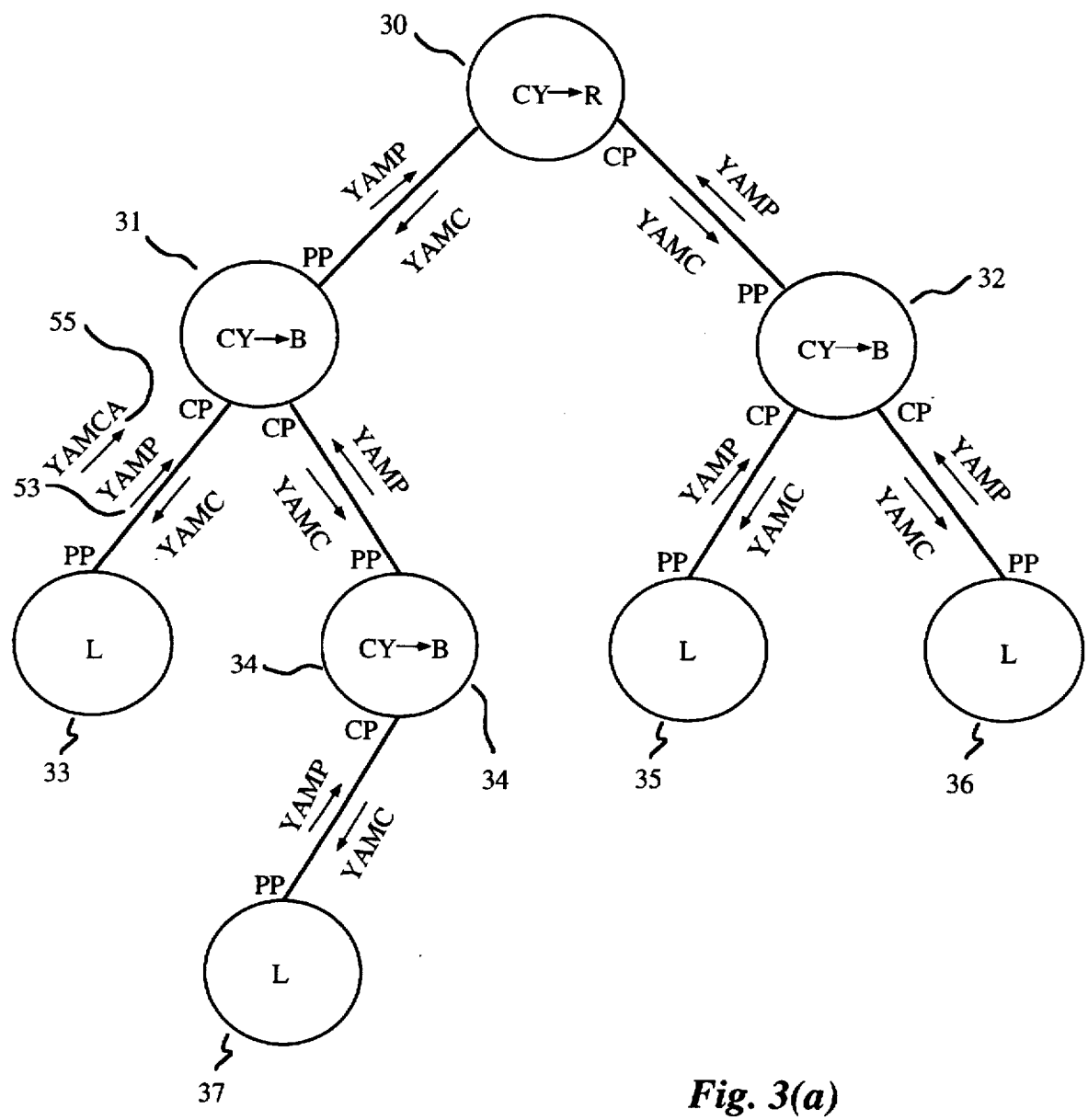
FIG. 3(a) is the arbitrarily assembled collection of nodes of FIG. 2(a) undergoing the graph transformation process in accordance with the present invention.
Figure 3B:
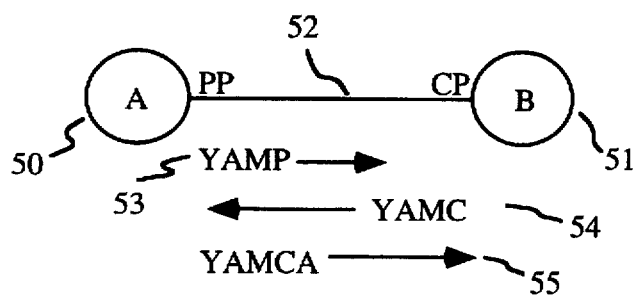
FIGS. 3(b)-3(d) illustrate alternative communications exchanges between nodes in implementing the present invention.
Figure 3C:
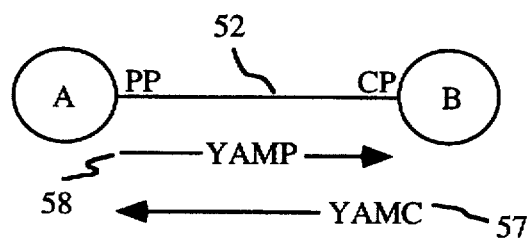
Figure 3D:
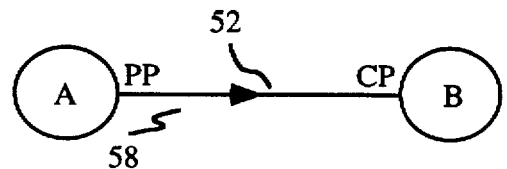

Initially, the process of transforming an acyclic arbitrary topology graph into a directed graph will be described. The case where cycle resolution is required will follow. FIG. 3(a) shows the arbitrary graph of FIG. 2(a) wherein the nodes and links have status labels and communicated signals are indicated for the graph transformation process for directing a graph. It is instructive at this point to describe signal communications between nodes. FIG. 3(b) illustrates two nodes 50 and 51 (hereinafter node A and node B, respectively) coupled by link 52. As described, the link is the communications channel coupling transceiver ports of the respective nodes as described above with reference to FIG. 1. During the graph transformation process, it becomes necessary for nodes to establish parent-child relationships with adjacent nodes. Two nodes are said to be adjacent nodes if there is at least one link connected between a port of the first node and a port of the second node. In FIGS. 3(b)–3(d) it will be assumed that the relationship to be resolved is that node B is the parent of node A and that it is appropriate for the nodes to establish that relationship.

Prior to a direction being established, when it become appropriate for node A to establish node B as its parent, node A will transmit from its port to which link 52 is coupled the signal "You Are My Parent" (YAMP). This message content may take any form, so long as node A knows that it is signaling YAMP and node B is capable of understanding that the received message is YAMP. When YAMP signal 53 is received by node B, node B will respond to node A by sending "You Are My Child" (YAMC) through link 52 to node A. The arbitration state machine logic 11 of node A will keep track of the time delay between sending YAMP signal 53 and receiving YAMC signal 54. The time measured signifies twice the propagation delay between nodes A and B. Upon receiving the YAMC signal, node A will respond with a "You Are My Child Acknowledged" (YAMCA) signal 55. This provides node B with the ability to also determine the propagation time delay between the nodes equal to the time delay between sending YAMC and receiving YAMCA. For half duplex communication links, the YAMCA message also has the effect of properly orienting the communication channel.

For full duplex communications channels the three logical messages, YAMP, YAMC and YAMCA can alternatively be relayed by only two signal transmissions. In FIG. 3(c) this situation is illustrated where node A asserts the YAMP signal 56 continuously until it receives the return YAMC signal 57. The YAMCA signal is logically transmitted to node B when the YAMP signal is detected as no longer arriving.

The use of this described triple asynchronous message exchange provides a mechanism by which both nodes involved in the message exchange can determine the propagation time delay through the link. This delay value is used in resolving contention events to be described further herein as well as during normal bus arbitration to optimize bus performance. The dynamic extraction of this parameter is not mandatory. As an alternative a maximum propagation time delay can be apriory defined at the expense of optimum bus performance.

Once nodes A and B have exchanged messages signifying that node B is the parent of node A, the link can be said to be directed. Node A within its logic labels its port to which link 52 is coupled as a parent port (it talks to a parent node) and node B labels its port to which link 52 is coupled a child port (it talks to a child node). It is important to maintain the labels that ports achieve because the methods to be described below will be in terms of the labels assigned to nodes and ports at a given time. A short hand graphical notation is illustrated in FIG. 3(d) where the direction arrow 58 indicates that node B is established as the parent of node A and the link is directed.

Direction Determination

Referring back now to FIG. 3(a) and to process FIGS. 6(a)–6(f), the process of directing the overall arbitrary topology will now be described. It is necessary to introduce a few more colorful definitions to aid in explaining the topology transformation process. First, a "leaf" node is defined as a node with only one connected port. A node recognizes its status as a leaf node as soon as it is initialized after power-up or other bus initialization. A "branch" node is a node which has a least two connected ports. Through all but one of the connected ports a branch node will have received the YAMP signal and have acknowledged it. Through its remaining port, a branch node has sent the YAMP signal thus establishing that it has a parent node. A node does not achieve branch status until it has established that it has one parent (a node can have only one parent node) and all its other ports are connected to child nodes. Prior to achieving branch status, a node is considered a "cycle" node because until it is determined to be a branch the possibility exists that the node is part of a cycle which makes establishing direction impossible.

The graph transformation procedure begins at step 60 upon bus initialization (power-up or instigated) at which time the leaf nodes in the arbitrary topology recognize at step 61 and label themselves at step 68 as leaf nodes by determining that they have only one connected port at decision box 66. In the graph depicted in FIG. 3(a), nodes 33, 35, 36 and 37 are leaf nodes which, once initialized, at step 69 each transmits the YAMP signal through its only connected port to its adjacent node. The nodes receiving these signals will then propagate the YAMC signals back to the leaf nodes at step 70, thus establishing a direction for the given link between respective parent-child pairs when the YAMCA communication is completed. At step 71 each leaf node labels its one connected port as a parent port and each receiving port on the parent node is labeled a child port.

Figure 3E:
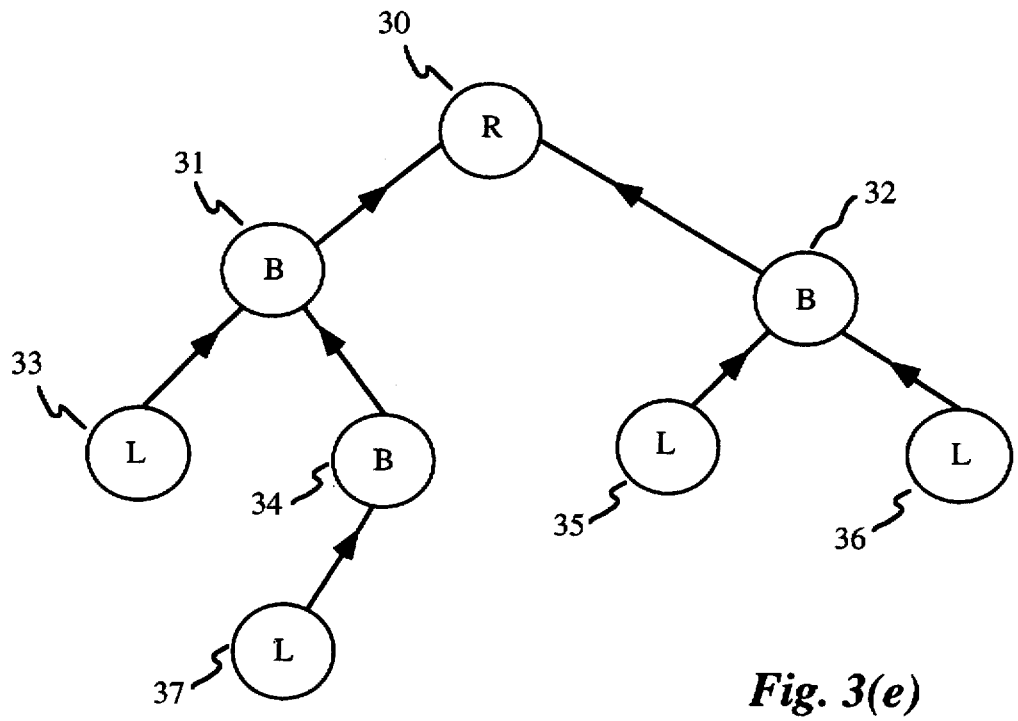
FIG. 3(e) graphically illustrates the directed graph resulting from the arbitrarily assembled network of nodes of FIG. 2(a).

The nodes on the graph which are not initially leaf nodes are initially considered "cycle nodes" for the reason described above and proceed according to the Cycle Node Procedure 63. Any cycle node which has labeled all but one of its connected ports as child ports then propagates the YAMP signal from its remaining unlabeled port at step 85. When that direction is established for the link, the cycle node then becomes labeled a branch node. Thus, after leaf node 37 establishes that node 34 is its parent, node 34 has only one unlabeled port (having labeled the link connection to node 37 as being through a child port) so node 34 broadcasts the YAMP signal to node 31, resulting in node 34 becoming a branch node. Likewise, once node 31 has identified that nodes 33 and 34 are its children, node 31 broadcasts the YAMP signal to node 30. When one node has received through all of its ports the YAMP signal at decision box 75, that node becomes the root node. In FIG. 3(a) after node 30 has received the YAMP signals from nodes 31 and 32, its label changes from being a cycle node to being the root node. In the graph of FIG. 3(a), it is not necessarily the case that node 30 would become the root. If some of the links in the tree provided long propagation delays, node 30 might have received a YAMP signal on one port and then transmitted a YAMP signal through its other port. Any of the nodes may become the root, even a leaf, the root property taking precedence. FIG. 3(e) shows the resulting directed graph in response to the communicated signals shown in FIG. 3(a) with each node labeled and the directions indicated by dark arrows.

Root Contention

Figure 4:
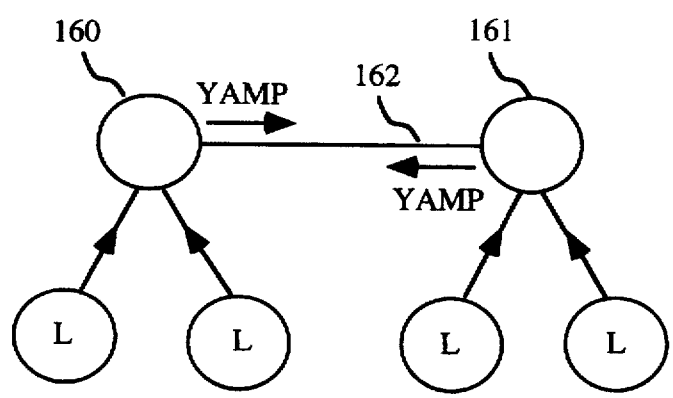
FIG. 4 illustrates a symmetrical graph arrangement which requires resolving a root contention.

In certain circumstances a root contention situation may arise. This may happen for example in the case where the arbitrary topology has a symmetrical arrangement to it such as that shown in FIG. 4. In the arbitrary graph illustrated in FIG. 4, nodes 160 and 161 have each established that it is a parent to the two leaf nodes to which it is coupled. Then, each has propagated the YAMP signal to the other at nearly the same time. The root contention situation is recognized by both nodes involved at decision box 86. Each node is receiving a signal which designates it as a parent while it has sent the same signal out through the same port. Each of the contending nodes responds to the other with the YAMC signal at step 91 which allows each to determine the "decision time period" which is equal to twice the propagation time between the nodes.

The root contention situation is resolved by utilizing a random decision mechanism incorporated on each arbitration state machine logic unit 11 of each node. For every "decision time period" that elapses, each node will randomly decide at step 92 (with a 50% probability) whether to again transmit the YAMP signal to the other. Almost certainly within a finite number of the cycles, one node will decide to designate the other its parent without that one reciprocating. The one that is designated the parent becomes the root at step 95. Alternatively, predetermined selection criteria values may be assigned to nodes, the larger or smaller determining which dominates in a contention event. The dynamic determination of the "decision time period", while it offers optimum performance is not essential in implementing the present invention. As an alternative an apriory defined "decision time period" may be used as long as it is greater than the worst case link propagation that can be encountered in any bus using this algorithm. The same method used to resolve root contentions will also be used to resolve other contention events to be described further herein.

Root Assignment

As described above, the result of the graph transformation process is the assignment of the root attribute to one and only one node in the graph. The root node will have the ultimate decision in the bus arbitration scheme to be described and therefore can access the bus with maximum priority without the use of special priority time gaps. It is often desirable to be able to assign the root property to a predetermined node either when it is manufactured or dynamically (during run time) to optimize a given system. A given bus may include a node which requires isochronous data transfer. Isochronous data is data that must be transmitted at a given time to be of any value. For example, music from a compact disc needs to be transferred and output in the order in which it is to be heard and with no significant delays, unlike data files which may be transferred piecemeal and not necessarily in order.

Nodes can be classified into three categories with respect to root designations. These designations may be applied during manufacturing by hard-wiring the designation into the device, programming the arbitration state machine logic or by higher level software making the decision then initiating a reboot while preserving that decision. The three designations that a node may be assigned with respect to being designated a root are: nodes that do not want to be root, nodes that may (should) be root and nodes that shall be root. These designations are tested for at steps 81 and 83. A node designated in the first category will begin the graph transformation procedure as soon as it is directed to do so. This will usually be immediately following the completion of the bus initialization procedure. A node from the second category will delay the beginning of the graph transformation procedure for a predetermined amount of time after it is directed to begin the procedure at step 84. By this delay, the node increases its chance of becoming the root. (The YAMP signals are more likely to propagate to it due to the delay.) Despite the added delay, it is still possible that a "may be root" node will not wind up being designated the root. This will depend on the given topology and message propagation delays. The amount of delay can be defined during design to be greater than a reasonable worst case propagation delay through a fairly complex graph.

A node from the third category of root designation possibilities may only recognize the fact that it must be the root after the graph has already been transformed and all nodes have identified themselves. The arbitration state machine logic may make this determination or software running on the host system. When this occurs, the node that has to be root agrees with all other nodes on the bus that it is going to be the one and only root and restarts the graph transformation process by signaling a preemptive bus initialization signal which is described further herein. The node then waits at step 82 to become the root and does not participate in the graph transformation until it has received the YAMP signal on all of its ports, thus forcing it to be designated the root.

Once the root has been determined, the graph can be said to be directed. There is a defined relationship existing between all adjacent nodes on the graph.

Cycle Resolution

The procedures described above for directing a graph will only work for an acyclic graph. If there are cycles in the arbitrary topology, they must be broken by the procedure beginning at step 80. This is done by intelligently treating certain links as though they are not connected. The existence of a cycle is detected at step 79 when, after a predetermined time-out period has elapsed, a node is still labeled a cycle node rather than a leaf, branch or root. The "cycle detect" timing starts immediately after the end of the bus initialization function. The time-out period need be no longer than the worst case duration of the graph transformation process (adding in delay time for a "may be root" node and a possible root contention event).

The "cycle detect" time-out event does not have to occur synchronous for all nodes of a graph as all message exchanges are asynchronous events. As such, it is possible for a node which has not yet reached its "cycle detect" time-out event to receive a message indicating that cycle resolution is ongoing. Such a node will terminate its cycle detect time-out interval and begin the appropriate cycle resolution process.

The method of cycle resolution may require different iteration processes depending upon the graph topology. Essentially there are two types of cycles, simple cycles and multiple cycles. Multiple cycles exist where there are nodes that meet the definition of multiple cycles nodes. A multiple cycles node is a cycle node which has at least three connected ports through which it has not received the YAMP signal. A multiple cycles node has at least three adjacent cycle nodes. It will belong to either at least two distinct graph cycles, or to at least one graph cycle and to a branch wherein there is a node having the "shall be root" designation (which therefore has not propagated a YAMP signal). These ports are labeled by the node as cycle ports. A node may only be considered a multiple cycles node during the cycle resolution process. In contrast, a single cycle node is one which has two and only two connected ports through which it has not yet received the YAMP signal.

Multiple Cycles Resolution

Figure 5A:
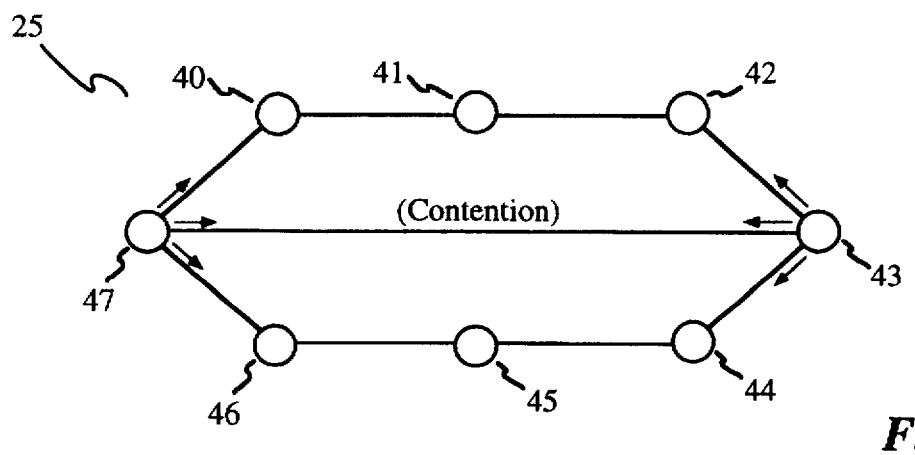
FIGS. 5(a)-5(d) illustrate a plurality of nodes being processed through the various steps of the cycle resolution procedure.
Figure 6A:
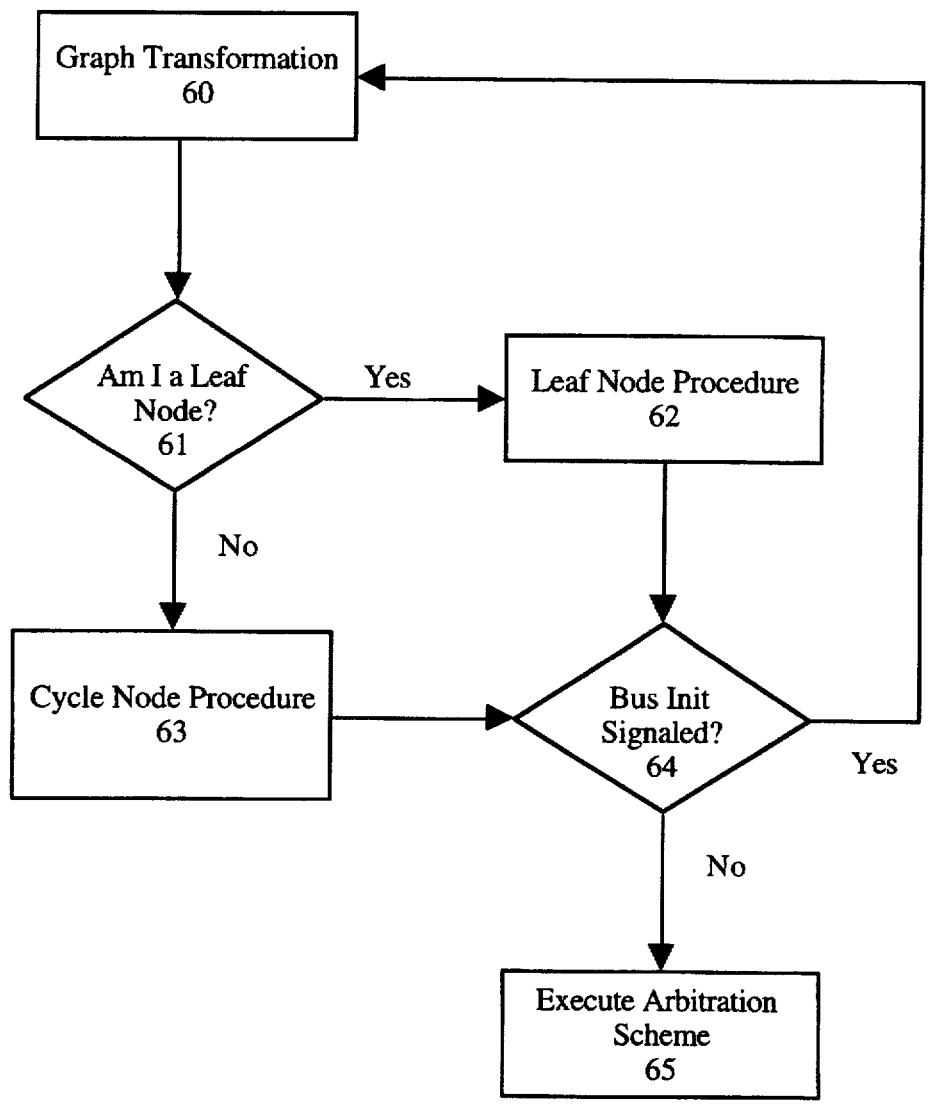
FIG. 6(a)-6(f) illustrate the process flow for carrying out the graph transformation procedure in accordance with the preferred embodiment of the present invention.
Figure 6B:
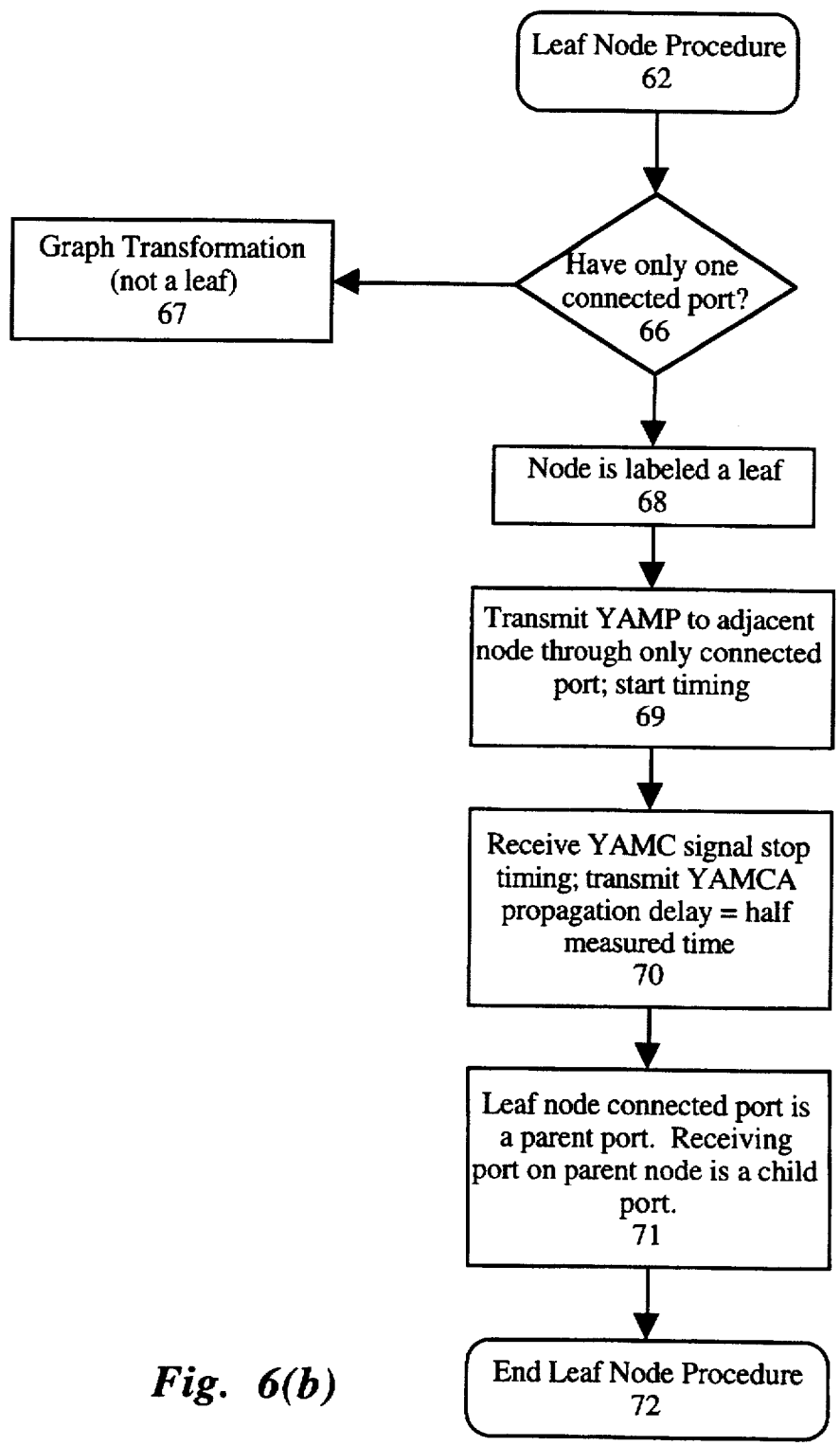
Figure 6C:
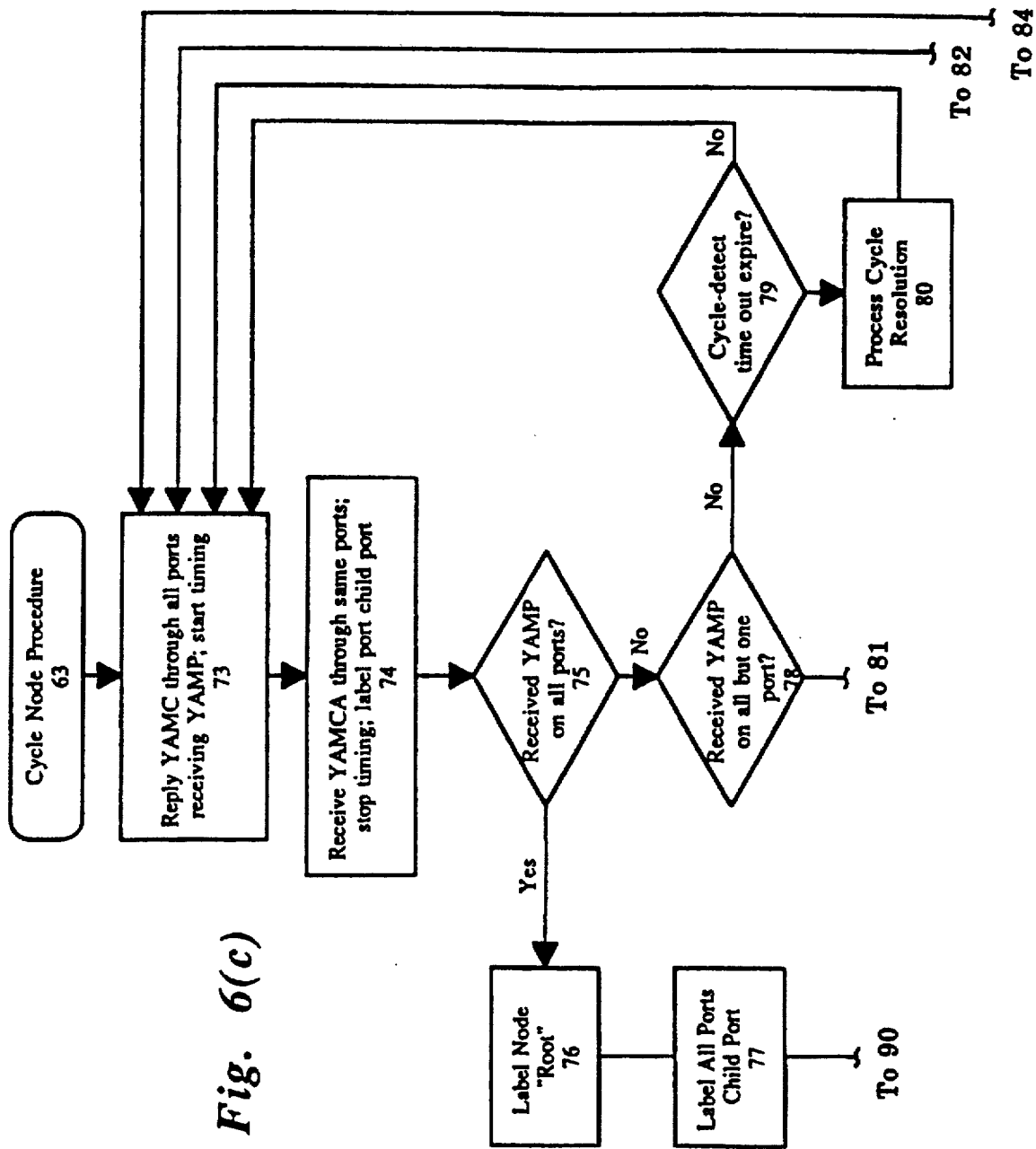
Figure 6C:
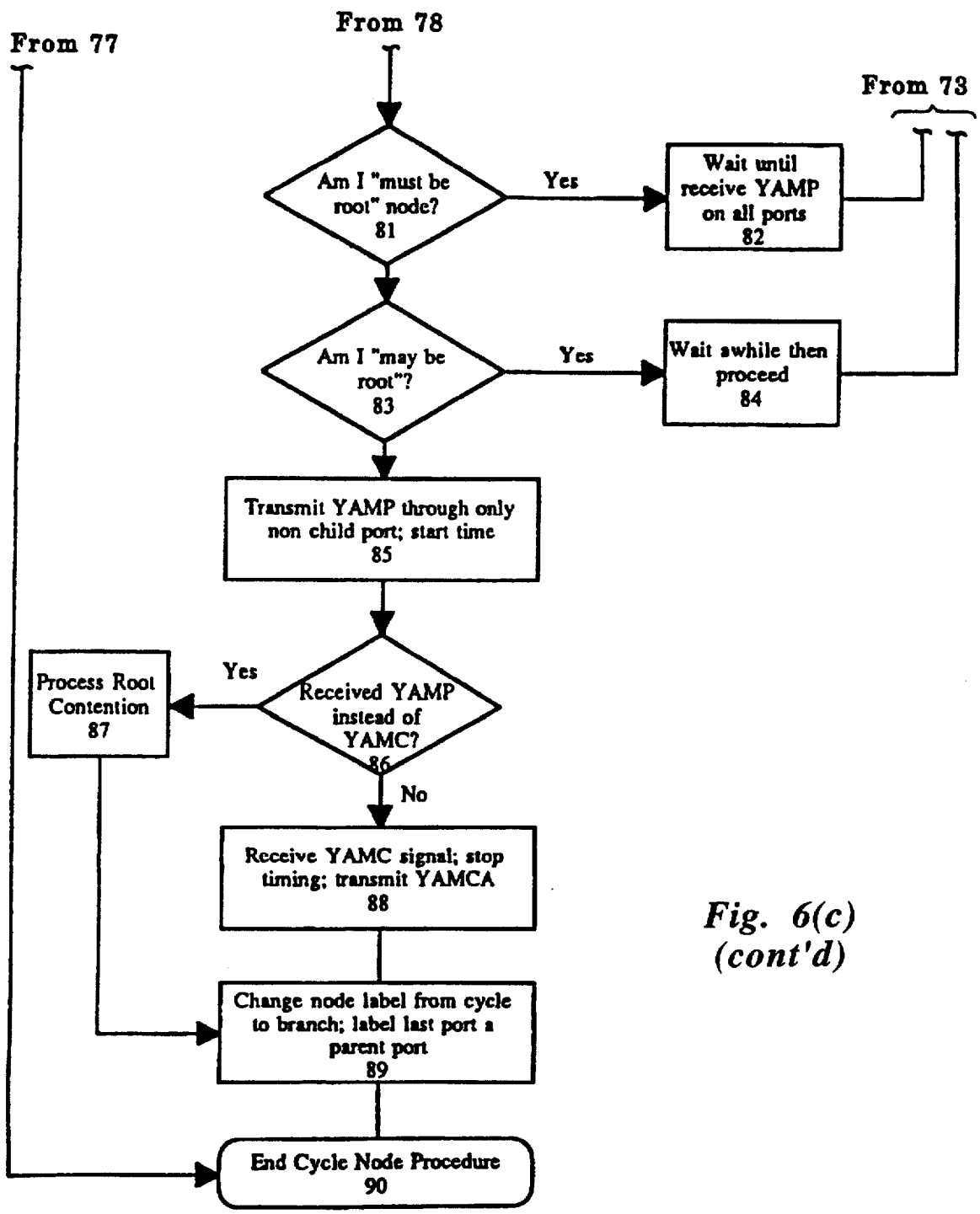
Figure 6D:
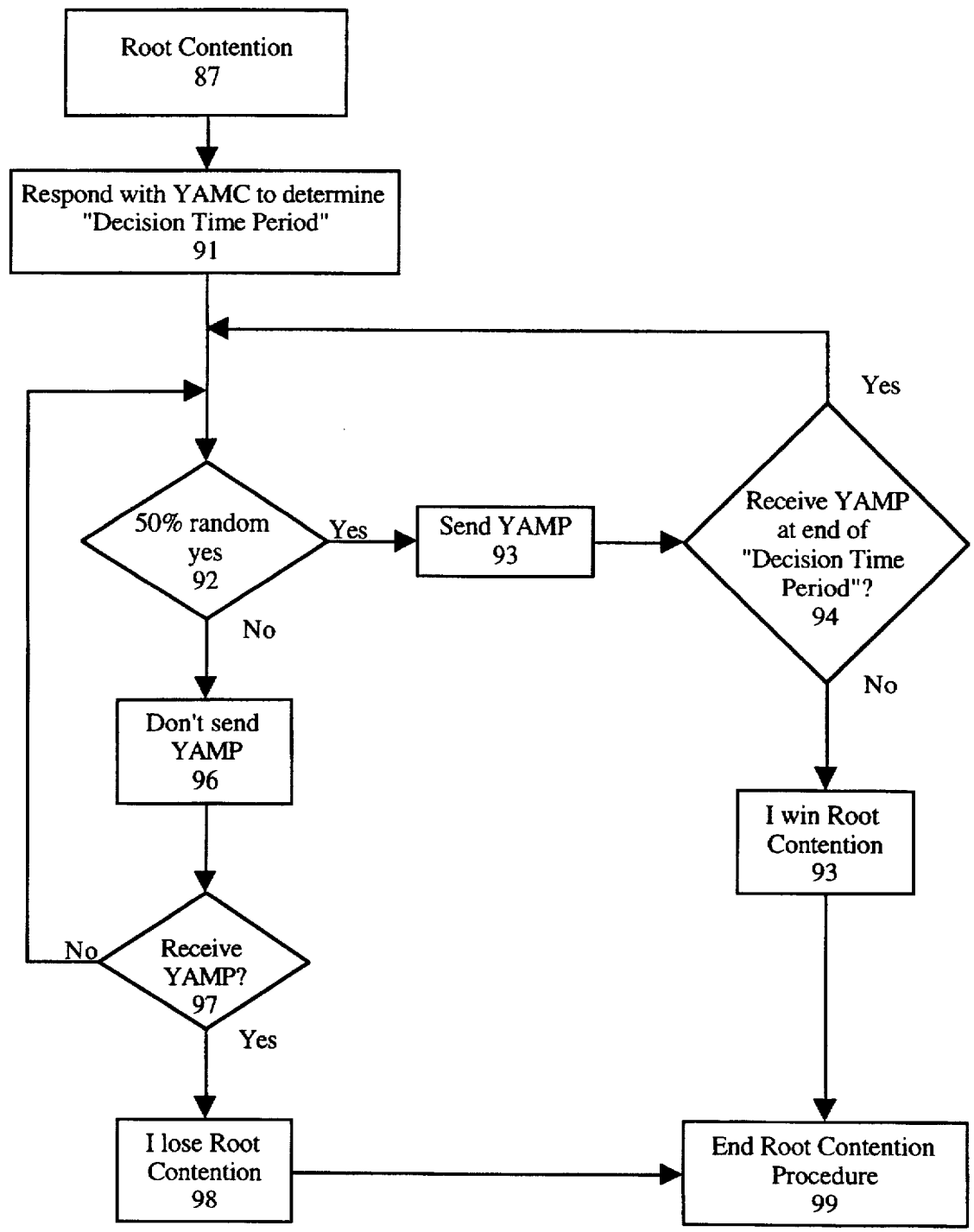
Figure 6E:
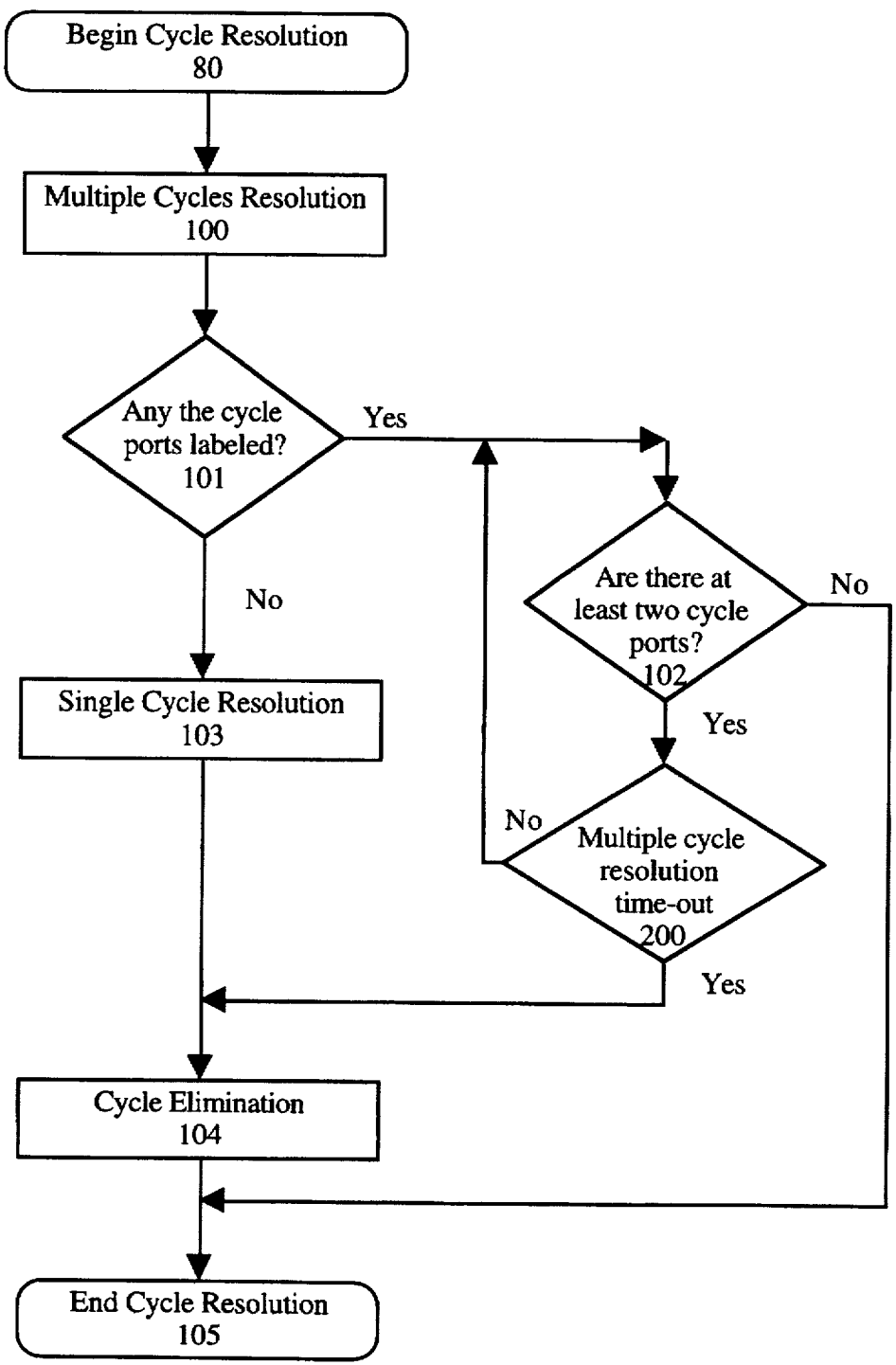
Figure 6F:
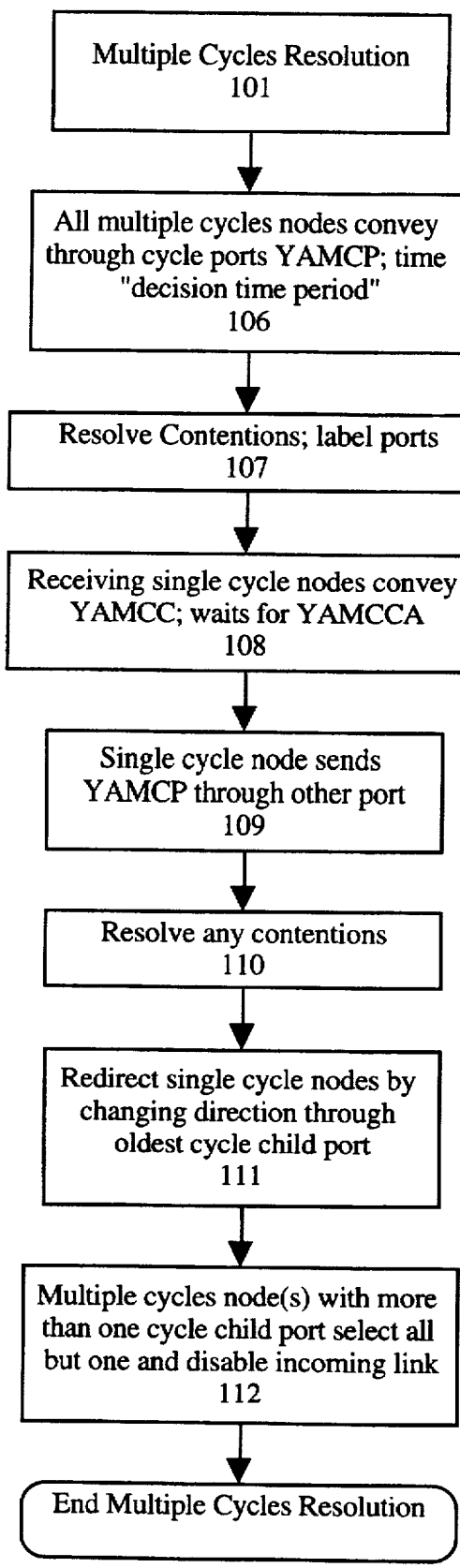

During cycle resolution, if there exist any multiple cycles nodes at step 100 then the Multiple Cycles Resolution Process 100 must be performed. FIG. 5(a) illustrates in greater detail the portion 25 of the arbitrary topology shown in FIG. 2(b). In this figure, nodes 40–47 form multiple cycles because there are two nodes, 43 and 47, which are linked to more than two other cycle nodes. FIG. 6(f) illustrates the process flow for multiple cycles resolution.

When the cycle detect time-out period terminates, at step 106 all multiple cycles nodes transmit through all their cycle ports a signal indicating "You Are My Cycle Parent" (YAMCP). If the YAMCP signal generates a reply conveying the message "You Are My Cycle Child" (YAMCC), the node responds with a "You Are My Cycle Child Acknowledged" (YAMCCA) at step 108 and labels the corresponding port as a cycle parent port.

If a node that has transmitted a YAMCP signal receives on the transmitting port a YAMCP signal before a YAMCC signal, a cycle contention event has occurred such as will be the case between nodes 43 and 47. The cycle contention event is resolved in the same manner as a root contention event wherein for each "decision time period" the contending nodes randomly (50% likelihood) each send or do not send the YAMCP signal until a decision time interval in which one of the two ports involved becomes a cycle parent port while the other one recognizes its status as a cycle child port. When a single cycle node receives through one or more of its ports the YAMCP signal, it replies with the YAMCC signal and awaits the return of a YAMCCA. After these exchanges, the ports are labeled cycle child ports.

When a single cycle node has labeled one of its two cycle ports as a cycle child port, it conveys the YAMCP signal through its remaining cycle port at step 109. If the YAMCC signal is received as a reply without interference, then the node sends the YAMCCA and labels the port a cycle parent port. If, on the other hand, a contention situation occurs with the node receiving a YAMCP signal after transmitting the same, the cycle contention event is resolved at step 110 in exactly same manner as described above where other contentions between two nodes are resolved.

If a single cycle node winds up with both of its ports labeled as cycle child ports, one of the two links leading to the node must be redirected at step 111. This is a common situation and occurs where a single cycle node is situated logically between two multiple cycles nodes such as may be the case with node 41. The single cycle node selects one of its two connected cycle child ports, based upon an apriory defined criterion, and transmits the YAMCP signal. There will be no contention event, the receiving port with reply with the YAMCC to which the selected port replies YAMCCA and relabels the port that was a cycle child port as a cycle parent port. Ultimately in the cycle resolution process, every single cycle node will have one and only one port labeled as a cycle child port.

If a single cycle node receives the YAMCP signal through a port that was previously labeled as a cycle parent port, it shall respond with the YAMCC and wait for the YAMCCA at which time the port is relabeled as a cycle child port. That single cycle node will then have both cycle ports labeled as cycle child ports. The node will then select the port that has the older cycle child port label and transmit the YAMCP signal, thus reversing the direction of the link to that port. This process will continue until all single cycle nodes have one cycle parent node and one cycle child node. It should be emphasized that the criteria used for port relabeling should follow one of two rules. If the ports of a single cycle node are labeled as cycle child ports within the same time unit any apriory defined criterion is acceptable (always choose port X over port Y, etc.). If the ports have been labeled at different times the relabeling process should always involve the port which has been labeled a cycle child port the earliest in time. The method of a priory criterion selection may be a logical or hard-wired ordering of ports on a node. For example, each node may elect to make port 1 a higher priority than port 2 and port 2 a higher priority than port 3, etc. The node merely needs a rule for selecting one port in favor of another and to consistently apply that rule.

Figure 5B:
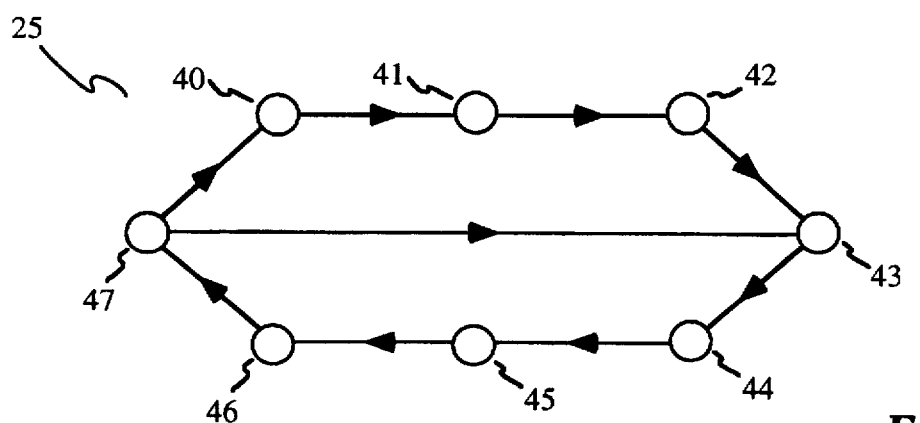
Figure 5C:
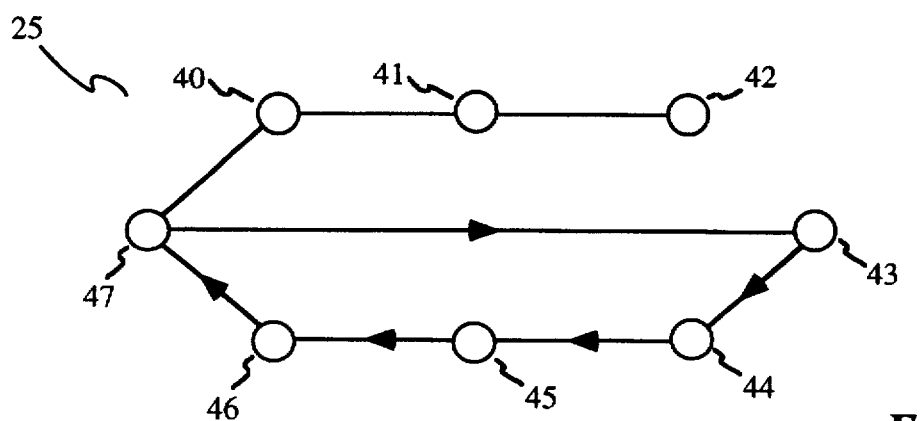

Once all single cycle nodes each have one cycle parent and one cycle child, at least one multiple cycles node will have at least one of its ports labeled a cycle child port either as a result of a contention with another multiple cycles port or as a result of relabeling message exchange. Depending upon the number of cycles in a graph a multiple cycles node may end up with more than one cycle port labeled as a cycle child port such as node 43 in FIG. 5(b) which shows the direction of all cycle links resulting from the above steps. When this occurs, the multiple cycles node will select all but one of its cycle child ports and transmits through it the "link disabled" (LD) message. Upon receiving the "link disabled completed" (LDC) reply signal the ports are labeled by the respective nodes as disabled child ports and removed from the logical bus. A cycle node (single or multiple) upon receiving on one of its ports labeled a cycle parent port the LD signal shall reply with the LDC signal, label the port a disabled parent port and remove it from the logical bus. Thus, even where a physical cable connects two nodes, it will be ignored as a link for communications purposes between the two nodes. In FIG. 5(c), the link between nodes 42 and 43 or between 43 and 47 will be disabled, breaking the multiple cycles into a simple cycle. The method of selecting which link(s) to disable may be apriory defined as described above for selecting redirecting propagation. If the direction of the links in the 47-46-45-44-43 chain had been reversed, the breaking of two of the links to 43 would have eliminated any simple cycles as well.

In the case where there is a dangling "shall be root" node which still has its cycle node attribute, the node will respond as described above with respect to cycle parent messages. At this point there will be no multiple cycles remaining with the broken links taken into account. The above breaking of the multiple cycles for the example shown in FIG. 5(b) will either yield no remaining cycles or one remaining simple cycle, a cycle in which all cycle nodes are single cycle nodes.

Simple Cycle Resolution

After the resolution of any existing multiple cycles, there may be remaining simple cycles. These will either be ones that were always simple cycles, or ones that result from the breaking of multiple cycles. The nodes comprising any simple cycles resulting from the breaking of multiple cycles will already be directed with respect to adjacent cycle nodes. Nodes in simple cycles that have always been part of simple cycles will have to be directed with respect to adjacent cycle nodes before the cycle can be broken.

For those single cycle nodes which do not yet have their cycle ports labeled at decision box 101, the following procedure should be carried out at step 103 in order to establish the direction with respect to the adjacent cycle nodes. At the beginning of the single cycle resolution process, a cycle node shall wait for a period of time equivalent to the "decision time period" defined previously. Then, based on any apriory arbitrarily defined criteria, a cycle node shall transmit on one of its two cycle ports, the YAMCP signal. If this results in any contention with an adjacent cycle node, the contention will be resolved in exactly the same manner as described above for resolving other contentions. If a node receives the YAMCP signal before initiating its own transmission, it will abort its own transmission and respond with the YAMCC signal. Upon receiving the reply YAMCCA signal, it shall label the port as a cycle child port and then transmit through the remaining port the YAMCP signal. In this way at no time will any cycle node have more than one cycle parent port. If a cycle node winds up with two cycle child ports, it shall select the oldest labeled port, unlabel it and transmit therethrough the YAMCP signal. At the conclusion of this process, all cycle ports are labeled either cycle parent or cycle child thus yielding direction to the links in the loop.

Figure 5D:
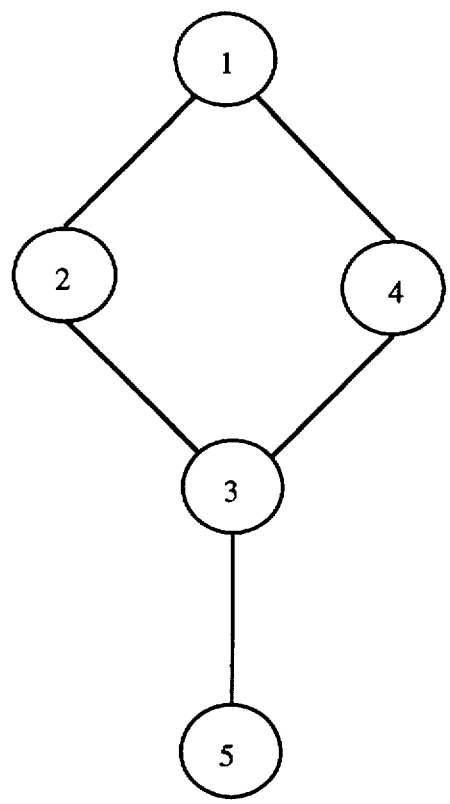

It should be noted that there is a special case where multiple cycle elimination will resolve all cycles. FIG. 5(d) illustrates this case where a single cycle graph has a dangling "shall-be-root" node, node 5. Though this is a single cycle graph, node 3 believes it is a multiple cycles node and begins the multiple cycle resolution process. At the end of the multiple cycle resolution process the cycle will be eliminated. One node will be left with only one cycle port, hence the test of decision box 102 to end the cycle resolution process with that node becoming a branch node.

Cycle Elimination FIG. 5(c) shows the nodes 40–47 with the link between nodes 42 and 43 depicted as logically not being present. Also indicated is the remaining directed loop encompassing nodes 43–47.

Once direction has been established for a cycle either as described in the preceding section or resulting from multiple cycles resolution, it is necessary to identify a "root cycle node" in order to break the cycle. Each node in the loop will randomly decide to send either one of two messages through its cycle parent port. The number of possible messages has to be at least two but may be greater. The only condition is that an order relation be defined between all possible messages and this relation be known to all the nodes. The content of these messages is insignificant other than that they be distinguishable and one be designated to have priority over the other. For illustrative purposes, we will describe this as "Cycle Message A" (CMA) and "Cycle Message B" (CMB). Each node will transmit its randomly selected message to its parent or parents and receive from its child the childs randomly selected message or the message forwarded by its child if the child has become a forwarding node. Every cycle node electing to transmit the CMB signal, but receiving a CMA signal will consider itself eliminated from the race to become the root cycle node and will from thereon merely forward any message received including the CMA message which has triggered the transformation. The time delay between successive messages generated and put out by a node which is not yet a forwarding node is a system parameter defined at design time. Its value shall be greater than the maximum propagation delay through a practical implementable cycle.

A node which does not become a forwarding node will output a predefined number of messages which is also a system parameter defined at design time. This number shall be large enough to guarantee probabilistically, with the desired level of certainty that at the end of this process one and only one node in the cycle remains a non-forwarding node. This remaining node will then be considered the root cycle node. The root cycle node will then send the LD signal through its child port at step 104 in the manner described above, thus logically breaking the link between the root cycle node and its child. This, therefore, breaks the cycle and when all cycles are broken the overall graph is acyclic.

The reason the root cycle node breaks the link with its child node is to accommodate the possibility that there is a a waiting "shall be root" node appended to the root cycle node. It should be noted that once a cycle is a directed cycle, cycle nodes will only have a single cycle child but may have more than one cycle parent (as in the case of the waiting "shall be root" node). A shall be root dangling node or chain of nodes will have the attribute of being a cycle parent node to the root cycle node, a link to which should not be broken. Once each of the loops is broken, and no cycles remain, the procedure for transforming the graph as described in the earlier sections may proceed until the entire graph is both acyclic and directed.

Unique Physical Address Assignment

Once a directed acyclic graph has been established from the original arbitrary topology, it is then possible to assign unique physical addresses to each node on the graph. This process begins with all leaf nodes requesting the bus by transmitting through their single connected ports the Bus Request (BR) signal. The parent node receiving the signal will wait until it has received the BR signal from all of its child ports and then will propagate the BR signal to its parent. The BR signals will propagate through the graph until the root has received the BR signal from all of its children. Once the root has received a bus request through all of its child ports, it will make a decision for granting the bus through one port and propagating a Bus Denial (BD) signal through its remaining child ports. The method for selecting which bus request to grant may be an apriory decision such as that described above where, for example, ports are selected from left to right or based on port numbering, etc. The Bus Grant (BG) signal will be transmitted from the root to its requesting child. If that requesting child is itself a parent node which has propagated the bus request from one of its children, it will send the bus denial signal through all but one of its child ports in the same predetermined fashion as described above. Eventually one leaf node will receive the bus grant signal to which it will reply with a Bus Grant Acknowledged (BGA) signal which will be propagated back to the root node. The propagation of the BD and BGA signals serve to orient the communication links which may be necessary for the case of half duplex communications channels. All of the denied nodes will then wait for activity by the node which finally receives the BG signal.

Figure 7:
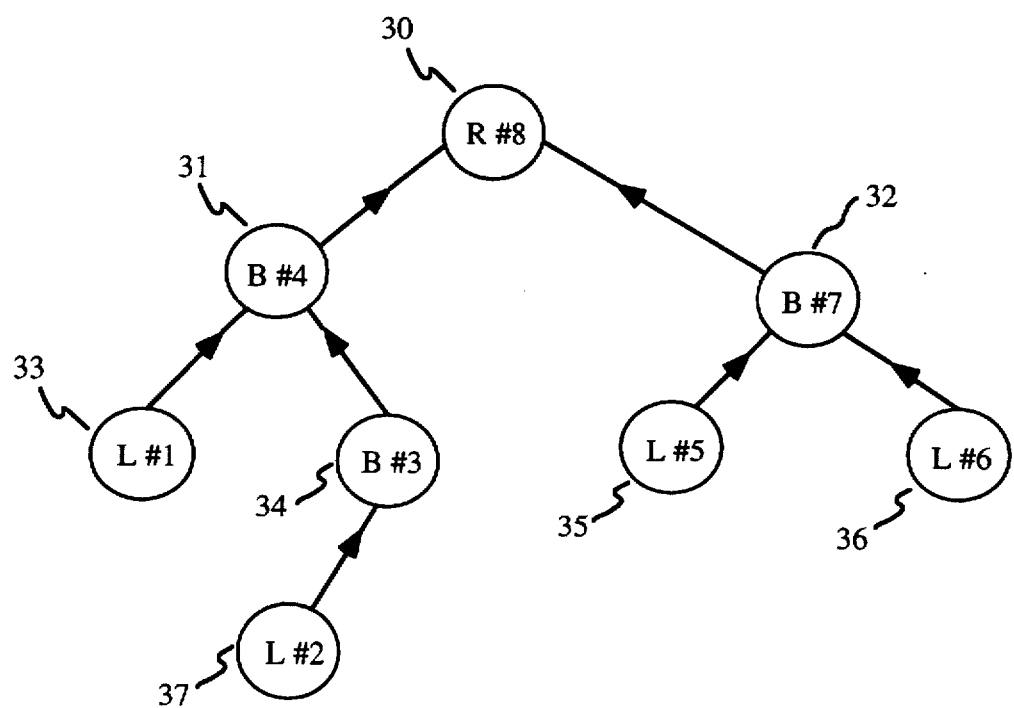
FIG. 7 illustrates a directed acyclic graph with a possible unique address assignment order indicated.

The node which is finally granted access to the bus will transmit an address assignment packet. The node will transmit this packet on the bus and it will be received by all other nodes, each of which will count the number of address packets they receive. The transmitted address packet may have any arbitrary information. A node's unique physical address will be based on the number of address packets a node has counted before it transmits an address packet. Thus, no two nodes will acquire the same physical address despite not having address information assigned in advance. The actual composition of the address packet is arbitrary and may be any bit stream efficiently utilizable by the system. After transmitting the physical address assignment packet, a node will transmit a "Child ID Completed" signal (CIC) signal. The parent node receiving this on its child port will then transmit the "Child Identification Completed Acknowledgment" (CICA) signal and label the port as an identified child port. In response to the next BR signal propagation, the parent of the node which has just identified itself will then select its next child to transmit the physical address packet. Once all the child nodes of a parent node have identified themselves, the parent node will request the bus and, when granted the bus, will propagate its physical address assignment packet. This procedure will continue following the predetermined selection criteria until all nodes determine a unique physical address assignment by counting. FIG. 7 illustrates the graph of FIG. 3(e) in which a left-to-right predefined selection criteria is implemented. The nodes are uniquely assigned addresses where node 33 receives the first and as described, the root node 30 receives the eighth and last address.

When this procedure is completed, each node in the graph will have a unique physical address, which need not have been determined in advance and which may be utilized for system management or other purposes.

Node Self-Identification

The process of node self identification essentially follows the same routine as the physical address assignment procedure described above. As each node transmits its physical address assignment packet, that packet may include further information such as identification of the physical device comprising the identification of the local host related to the node, how much power it requires, and, for example, whether it supports a "soft power-on" attribute, etc. In fact, the node self-identification information may serve as the physical address assignment packet because the practice of sending any information at all provides the basis for counting to yield unique physical addresses.

With respect to the node self-identification packet, the particular information concerning the node need only be "listened" to by those nodes affected by the nature of the announcing node. This procedure, as with the above, proceeds until all nodes have transmitted their node self identification information.

Topology Mapping

The method of topology mapping follows along the same lines as physical address assignment and node self-identification. This procedure thus has each node, when it is going through the address assignment or node self-identification process, further transmit information concerning all of its ports such as the number of child ports it has and whether or not it has any disabled ports. With respect to disabled ports, it may be desirable to implement a communication protocol between ports that are disabling so that they can identify from whom they are disabled. Thus, when a port identifies a disabled port it will give an identifier indicating its own ID as well as the port ID from which it has become disabled.

By assembling all the topology information about all the ports received during the topology mapping procedure, the bus server, host or any software level application may logically reconstruct the resolved bus topology. This is useful for many purposes including implementing redundancy where if a link unexpectedly goes down, previously disabled links may serve to prevent the loss of communication channels to any nodes.

Fair Bus Access Arbitration

Once the topology mapping, node self identification or physical address assignment routines have completed, the bus can be considered up and running. One arbitration scheme implemented in accordance with the present invention is that of fair bus access. When a node desires access to the bus, it sends through its parent port (unless it is the root) a bus request (BR) signal. The parent, upon receiving the BR signal from one child sends a bus denied signal (BD) through all its other child ports. The parent then propagates the BR signal upward through its parent until the signal reaches the root. The root issues a bus grant signal (BG) responsive to the first BR signal it receives and sends the BD signal through all of its other child ports which propagate downward thereby orienting the links. The BG signal propagates downward through the graph until it reaches the requesting node which then sends Bus Acknowledge (BA) signal followed by the packet of information that the node needed to send on the bus. When the packet is completed, all nodes return or enter into an idle state.

In the case where the root receives nearly simultaneous requests for the bus, the predetermined selection criteria for the root node will be used for granting to one of the nodes bus access. This may be the same predetermined priority selecting criteria as described above.

A further aspect of fair bus access arbitration is that a parent node has priority over its children. Thus, when a parent node wants the bus, it sends the BD signal through all of its child ports, then propagates the BR signal up toward the root. One potential problem with this mechanism is that if the parent has a large quantity of information to transmit on the bus a child node may have trouble getting adequate bus access. There is therefore introduced a gap system which is widely used and well-known in the art. After a node has utilized the bus, the node must wait for one gap period before it can again request the bus. This gives equal chance of being granted the bus to every node on the bus independent of its topological placement on the bus. In order to guarantee a fair arbitration protocol the length of the gap has to be greater than the worst case signal propagation delay through the bus. The gap value can be predetermined and hard-wired into the node logic but such an approach will result in all but the most extreme case in a sub optimal utilization of the bus. The topology mapping capability together with the measurement of the propagation delay between adjacent nodes performed during the graph transformation phase enables the calculation of an optimal fair gap that will maximize the bus performance for any specific implementation.

Priority Bus Arbitration

In the bus arbitration scheme implemented in accordance with the above fair bus access arbitration, it may be desirable that the root always have bus priority. When this is implemented, the root node may grant the bus to itself at any time. This is done by first sending the BD signal down through all of the nodes in the graph. Priority bus access for the root is very useful for the case where the root node is required to perform isochronous data transfer.

Token Passing Bus Arbitration

As an alternative to the fair and priority bus access arbitrations schemes described above, the present invention may be utilized in implementing a token passing bus arbitration scheme. Metaphorically speaking, token passing bus access refers to the notion that a node may communicate on a bus when it is in possession of a token that is passed between nodes. The token is passed from node to node in a cyclic fashion so that each node receives the bus in a predetermined point in the cycle. Token passing is implemented in the present invention in following the same manner as the physical address assignment routine described above. The predetermined selection mechanisms implemented are used to select the order in which the token will be passed from node to node. This order resembles the order as shown in FIG. 7 which dictates the order of unique address assignment. Each node, when it is assigned the token will propagate its information packet on the bus while the remaining nodes listen. The node will then pass the token to the next logical node based on the predetermined sequencing method as described above.

Preemptive Bus Initialization

An important feature that may be implemented in accordance with the present invention is the notion of preemptive bus initialization. The state machine logic incorporated on each node is capable of triggering a bus initialization (BI) signal to be propagated from the node through all of its ports upon certain conditions. When a node has determined it is necessary to signal a bus initialization condition, it will propagate the BI signal out through all of its ports for a length of time sufficient to guarantee that all adjacent nodes have received it and then released. A node will then go into the initiating procedures which then lead to the graph transformation process in the above described procedures.

There are a number of situations which may make it necessary or desirable to trigger a preemptive bus initialization. First, this may be a node response to an unforeseen error. Additionally, at the host level, it may be determined that a different node should acquire the root attribute, for example, an isochronous data transfer node. This assignment will be preserved throughout the bus initialization routine thereby causing the desired node to wait during the transform procedure until it receives the root designation. Another condition leading to a preemptive bus initialization may be the breakage of a link, in which case it may be necessary to calculate a new acyclic directed graph for the attached nodes. Finally, an important situation in which a preemptive bus initialization should occur is when a device is added to the network, referred to as "hot addition" of peripherals. The port to which a new device is connected will detect the presence of a new node and trigger a bus initialization which will be transparent to the user of the system but which allows the addition and subtraction of peripherals, for example, without having to shut down and repower. A new acyclic directed graph is calculated which includes the presence of the added node. It is possible that upon removing certain nodes, it will not be necessary to trigger a bus initialization, for example, when a leaf node is removed, there is no harm to the network. However, if a branch node is disengaged from an operating bus, it is likely to be necessary to reconfigure the graph.

Although the present invention has been described in terms of preferred embodiments, it will be appreciated that various modifications and alterations might be made by those skilled in the art without departing from the spirit and scope of the invention. The invention should, therefore, be measured in terms of the claims which follow.

I claim:

1. A method for transforming an arbitrary topology of devices, each having at least one port for communicating with other devices, into a directed acyclic topology of devices comprising the steps of:

identifying one or more leaf nodes, wherein the leaf nodes include only one port having a connection to a first set of adjacent devices;

labeling the connected port on each of the one or more leaf nodes as parent ports;

labeling one or more ports on the first set of adjacent devices coupled to corresponding one or more parent ports on the leaf nodes as child ports;

labeling all ports not identified as child ports and not identified as parent ports as cycle parent ports;

sending a signal from the cycle parent ports to ports on a second set of adjacent devices;

resolving conflicts between cycle parent ports by eliminating multiple cycles, if any, then eliminating single cycles, if any, such that a first subset of the cycle parent ports are relabeled as parent ports and a second subset of the cycle parent ports are relabeled as child ports wherein the parent ports are connected to child ports; and determining a root node, wherein the root node has one or more child ports and no parent ports.

2. The method of claim 1, wherein devices not identified as leaf nodes are identified as cycle nodes subsequent to the step of identifying the one or more leaf nodes.

3. The method of claim 2, wherein cycle nodes are relabeled as branch nodes when the cycle node has one parent port and the remaining ports are child ports.

4. A method for transforming a arbitrary topology of devices, each having at least one port for communicating with other devices, into a directed acyclic topology of devices comprising the steps of:

(a) identifying one or more leaf nodes, wherein the leaf nodes include only one port having a connection to a first set of adjacent devices;

(b) labeling the connected port on each of the one or more leaf nodes as parent ports;

(c) labeling one or more ports on the first set of adjacent devices coupled to corresponding one or more parent ports on the leaf nodes as child ports;

(d) labeling all ports not identified as child ports and not identified as parent ports as cycle parent ports;

(e) sending a signal from the cycle parent ports to ports on a second set of adjacent devices;

(f) resolving conflicts between cycle parent ports such that a first subset of the cycle parent ports are relabeled as parent ports and a second subset of the cycle parent ports are relabeled as child ports wherein the parent ports are connected to child ports:

(g) determining a root node, wherein the root node has one or more child ports and no parent ports;

(h) labeling devices not identified as leaf nodes as cycle nodes subsequent to the step of identifying the one or more leaf nodes, wherein steps (a) through (h) are performed for a predetermined period of time, and at the expiration of the predetermined period of time performing the steps of;

(j) detecting whether any cycles exist in the topology, wherein a cycle exists if it is possible to start from a particular device in the topology and return to the particular device after traversing connections and devices without any connection being traversed twice;

(k) eliminating all multiple cycles by logically disabling at least one of the connections between two multiple cycles; and (l) eliminating all single cycles by logically disabling at least one connection between two single cycle nodes.

5. The method of claim 4 wherein, subsequent to labeling connected ports in the leaf nodes as parent ports, performing the steps of:

sending a you are my parent (YAMP) signal to any connected adjacent devices;

starting a propagation timer;

waiting until a you are my child (YAMC) signal is received from the adjacent device; and stopping the propagation timer.

6. The method of claim 5, further comprising the step of sending a you are my child acknowledge (YAMCA) signal from the leaf node to the adjacent device via the parent port in the leaf node.

7. The method of claim 4, wherein the step of resolving conflicts further comprises the steps of:

sending a local you are my cycle parent (YAMCP) signal from the cycle parent ports to connected devices;

if an alien YAMCP signal is received by the cycle parent port from one of the connected devices, waiting a period of time within a predetermined range of times and sending a subsequent local YAMCP signal;

if a YAMCP signal is received before the subsequent local YAMCP signal is sent, sending a local you are my cycle child (YAMCC) signal;

if a YAMCP signal is received before the subsequent local YAMCP signal is sent, relabeling the cycle parent port as a parent port; if an alien YAMCC signal from another device is received, relabeling the port as a child port; and if an alien YAMCC signal from another device is received, relabeling the node as a branch node.

8. The method of claim 4, wherein in a multiple cycle, at least two devices are characterized as multiple cycle nodes, wherein multiple cycle nodes have more than two connections which are part of a cycle, and remaining devices of the cycle are characterized as single cycle nodes, wherein single cycle nodes have only two connections which are part of a cycle, the step of eliminating multiple cycles comprising the steps of:

directing hierarchically the nodes of the multiple cycle wherein all multiple cycle nodes in the multiple cycle propagate a you are my cycle parent (YAMCP) signal to which a responding node signals back a you are my cycle child (YAMCC) signal, wherein the single cycle nodes, upon having identified one adjacent node as a cycle parent node, the step continuing until all single cycle nodes have each identified one adjacent node as a parent node and other adjacent nodes as child nodes, at which time at least one of the multiple cycle nodes will have an adjacent node identified as a child node;

selecting one connection between two adjacent nodes in each multiple cycle; and logically disabling the selected connections such that multiple cycles are eliminated from the topology.

9. The method of claim 8, further comprising the steps of:

selecting one connections in each single cycle remaining in the topology, if any; and logically disabling the selected connections such that any single cycles in the topology are eliminated.

10. In a computer system having a plurality of devices interconnected by a plurality of connections in an arbitrary topology, wherein each device has at least one port having a connection to a corresponding port on an adjacent device, a method for transforming the arbitrary topology into a directed acyclic graph comprising the steps of:

identifying one or more leaf nodes, wherein the leaf nodes include only one port having a connection to a first set of adjacent devices;

labeling the connected port on each of the one or more leaf nodes as parent ports;

labeling one or more ports on the first set of adjacent devices coupled to corresponding one or more parent ports on the leaf nodes as child ports;

labeling all ports not identified as child ports and not identified as parent ports as cycle parent ports;

sending a signal from the cycle parent ports to ports on a second set of adjacent devices;

resolving conflicts between cycle parent ports by eliminating multiple cycles, if any, then eliminating single cycles, if any, such that a first subset of the cycle parent ports are relabeled as parent ports and a second subset of the cycle parent ports are relabeled as child ports wherein parent ports are connected to child ports; and determining a root node, wherein the root node has one or more child ports and no parent ports.

11. The method of claim 10, wherein the devices not identified as leaf nodes are identified as cycle nodes subsequent to the step of identifying the one or more leaf nodes.

12. The method of claim 11, wherein cycle nodes are relabeled as branch nodes when the cycle node has one parent port and the remaining ports are child ports.

13. In a computer system having a plurality of devices interconnected by a plurality of connections in an arbitrary topology, wherein each device has at least one port having a connection to a corresponding port on an adjacent device, a method for transforming the arbitrary topology into a directed acyclic graph comprising the steps of:

(a) identifying one or more leaf nodes, wherein the leaf nodes include only one port having a connection to a first set of adjacent devices;

(b) labeling the connected port on each of the one or more leaf nodes as parent ports;

(c) labeling one or more ports on the first set of adjacent devices coupled to corresponding one or more parent ports on the leaf nodes as child ports;

(d) labeling all ports not identified as child ports and not identified as parent ports as cycle parent ports;

(e) sending a signal from the cycle parent ports to ports on a second set of adjacent devices;

(f) resolving conflicts between cycle parent ports such that a first subset of the cycle parent ports are relabeled as parent ports and a second subset of the cycle parent ports are relabeled as child ports wherein parent ports are connected to child ports;

(g) determining a root node, wherein the root node has one or more child ports and no parent ports;

(h) wherein the devices not identified as leaf nodes are identified as cycle nodes subsequent to the step of identifying the one or more leaf nodes, wherein steps (a) through (h) are performed for a predetermined period of time, wherein at the expiration of the predetermined period of time, performing the steps of

19

(i) detecting whether any cycles exist in the topology, wherein a cycle exists if it is possible to start from a particular device in the topology and return to the particular device after traversing connections and devices without any connection being traversed twice;

(j) eliminating all multiple cycles by logically disabling at least one of the connections between two multiple cycles; and (k) eliminating all single cycles by logically disabling at least one connection between two single cycle nodes.

14. The method of claim 13, wherein, subsequent to labeling connected ports in the leaf nodes as parent ports, performing the steps of:

sending a you are my parent (YAMP) signal to any connected adjacent device;

starting a propagation timer;

waiting until a you are my child (YAMC) signal is received from the adjacent device; and stopping the propagation timer.

15. The method of claim 14, further comprising the step of sending a you are my child acknowledge (YAMCA) signal from the leaf node to the adjacent device via the parent port of the leaf node.

16. The method of claim 13, wherein the step of resolving conflicts further comprises the steps of:

sending a local you are my cycle parent (YAMCP) signal from the cycle parent ports to connected devices;

if an alien YAMCP signal is received by the cycle parent port from one of the connected devices, waiting a period of time within a predetermined range of times and sending a subsequent local YAMCP signal;

if a YAMCP signal is received before the subsequent local YAMCP signal is sent, sending a local you are my cycle child (YAMCC) signal;

if a YAMCP signal is received before the subsequent local YAMCP signal is sent, relabeling the cycle parent port as a parent port;

if an alien YAMCC signal from another device is received, relabeling the port as a child port; and if an alien YAMCC signal from another device is received, relabeling the node as a branch node.

17. The method of claim 13, wherein in a multiple cycle, at least two devices are characterized as multiple cycle nodes, wherein multiple cycle nodes have more than two connections which are part of a cycle, and remaining devices of the cycle are characterized as single cycle nodes, wherein single cycle nodes have only two connections which are part of a cycle, the step of eliminating multiple cycles comprising the steps of:

directing hierarchically the nodes of the multiple cycle wherein all multiple cycle nodes in the multiple cycle propagate a you are my cycle parent (YAMCP) signal to which a responding node signals back a you are my cycle child (YAMCC) signal, wherein the single cycle nodes, upon having identified one adjacent node as a cycle parent node, the step continuing until all single cycle nodes have each identified one adjacent node as a parent node and other adjacent nodes as child nodes, at which time at least one of the multiple cycle nodes will have an adjacent node identified as a child node;

selecting one connection between two adjacent nodes in each multiple cycle; and logically disabling the selected connections such that multiple cycles are eliminated from the topology.

20

18. The method of claim 17, further comprising the steps of:

selecting one connections in each single cycle remaining in the topology, if any; and logically disabling the selected connections such that any single cycles in the topology are eliminated.

19. In a network of computing devices including a plurality of devices interconnected by a plurality of connections in an arbitrary topology, wherein each device has at least one port having a connection to a corresponding port on an adjacent device, a method for transforming the arbitrary topology into a directed acyclic graph comprising the steps of:

identifying one or more leaf nodes, wherein the leaf nodes include only one port having a connection to a first set of adjacent devices;

labeling the connected port on each of the one or more leaf nodes parent ports;

labeling one or more ports on the first set of adjacent devices coupled to corresponding one or more parent ports on the leaf nodes as child ports;

labeling all ports not identified as child ports and not identified as parent ports as cycle parent ports;

sending a signal from the cycle parent ports to ports on a second set of adjacent devices;

resolving conflicts between cycle parent ports by eliminating multiple cycles, if any, then eliminating single cycles, if any, such that a first subset of the cycle parent ports are relabeled as parent ports and a second subset of the cycle parent ports are relabeled as child ports wherein parent ports are connected to child ports; and determining a root node, wherein the root node has one or more child ports and no parent ports.

20. The method of claim 19, wherein devices not identified as leaf nodes are identified as cycle nodes subsequent to the step of identifying the one or more leaf nodes.

21. The method of claim 20, wherein cycle nodes are relabeled as branch nodes when the cycle node has one parent port and the remaining ports are child ports.

22. A method for transforming an arbitrary topology into a directed acyclic graph in a network of computing devices including a plurality of devices interconnected by a plurality of connections in the arbitrary topology, wherein each device has at least one port having a connection to a corresponding port on an adjacent device the method comprising the steps of:

(a) identifying one or more leaf nodes, wherein the leaf nodes include only one port having a connection to a first set of adjacent devices;

(b) labeling the connected port on each of the one or more leaf nodes parent ports;

(c) labeling one or more ports on the first set of adjacent devices coupled to corresponding one or more parent ports on the leaf nodes as child ports;

(d) labeling all ports not identified as child ports and not identified as parent ports as cycle parent ports;

(e) sending a signal from the cycle parent ports to ports on a second set of adjacent devices;

(f) resolving conflicts between cycle parent ports such that a first subset of the cycle parent ports are relabeled as parent ports and a second subset of the cycle parent ports are relabeled as child ports wherein parent ports are connected to child ports;

(g) determining a root node, wherein the root node has one or more child ports and no parent ports wherein steps (a) through (g) are performed for a predetermined period of time, wherein at the expiration of the predetermined period of time performing the steps of (h) detecting whether any cycles exist in the topology, wherein a cycle exists if it is possible to start from a particular device in the topology and return to the particular device after traversing connections and devices without any connection being traversed twice;

(i) eliminating all multiple cycles by logically disabling at least one of the connections between two multiple cycles; and (j) eliminating all single cycles by logically disabling at least one connection between two single cycle nodes.

23. The method of claim 22, wherein, subsequent to labeling connected ports in the leaf nodes as parent ports, performing the steps of:

sending a you are my parent (YAMP) signal to any connected adjacent devices;

starting a propagation timer;

waiting until a you are my child (YAMC) signal is received from the adjacent device; and stopping the propagation timer.

24. The method of claim 23, further comprising the step of sending a you are my child acknowledge (YAMCA) signal from the leaf node to the adjacent device via the parent port.

25. The method of claim 22, wherein the step of resolving conflicts further comprises the steps of:

sending a local you are my cycle parent (YAMCP) signal from the cycle parent ports to connected devices;

if an alien YAMCP signal is received by the cycle parent port from one of the connected devices, waiting a period of time within a predetermined range of times and sending a subsequent local YAMCP signal;

if a YAMCP signal is received before the subsequent local YAMCP signal is sent, sending a local you are my cycle child (YAMCC) signal;

if a YAMCP signal is received before the subsequent local YAMCP signal is sent, relabeling the cycle parent port as a parent port;

if an alien YAMCC signal from another device is received, relabeling the port as a child port; and if an alien YAMCC signal from another device is received, relabeling the node as a branch node.

26. The method of claim 22, wherein in a multiple cycle, at least two devices are characterized as multiple cycle nodes, wherein multiple cycle nodes have more than two connections which are part of a cycle, and remaining devices of the cycle are characterized as single cycle nodes, wherein single cycle nodes have only two connections which are part of a cycle, the step of eliminating multiple cycles comprising the steps of:

directing hierarchically the nodes of the multiple cycle wherein all multiple cycle nodes in the multiple cycle propagate a you are my cycle parent (YAMCP) signal to which a responding node signals back a you are my cycle child (YAMCC) signal, wherein the single cycle nodes, upon having identified one adjacent node as a cycle parent node, the step continuing until all single cycle nodes have each identified one adjacent node as a parent node and other adjacent nodes as child nodes, at which time at least one of the multiple cycle nodes will have an adjacent node identified as a child node;

selecting one connection between two adjacent nodes in each multiple cycle; and logically disabling the selected connections such that multiple cycles are eliminated from the topology.

27. The method of claim 26, further comprising the steps of:

selecting one connections in each single cycle remaining in the topology, if any; and logically disabling the selected connections such that any single cycles in the topology are eliminated.

* * * * *